US011366013B2

(12) United States Patent
Horigome et al.

(10) Patent No.: US 11,366,013 B2
(45) Date of Patent: Jun. 21, 2022

(54) METHOD OF OBTAINING QUANTUM EFFICIENCY DISTRIBUTION, METHOD OF DISPLAYING QUANTUM EFFICIENCY DISTRIBUTION, PROGRAM FOR OBTAINING QUANTUM EFFICIENCY DISTRIBUTION, PROGRAM FOR DISPLAYING QUANTUM EFFICIENCY DISTRIBUTION, FLUORESCENCE SPECTROPHOTOMETER, AND DISPLAY DEVICE

(71) Applicants: HITACHI HIGH-TECH SCIENCE CORPORATION, Tokyo (JP); Inter-University Research Institute Corporation Research Organization of information and Systems, Tokyo (JP)

(72) Inventors: Jun Horigome, Tokyo (JP); Hiroki Okawa, Tokyo (JP); Takahiro Tamashima, Tokyo (JP); Imari Sato, Tokyo (JP); Yinqiang Zheng, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 108 days.

(21) Appl. No.: 17/009,175

(22) Filed: Sep. 1, 2020

(65) Prior Publication Data
US 2021/0063242 A1   Mar. 4, 2021

(30) Foreign Application Priority Data

Sep. 2, 2019 (JP) .............................. JP2019-159440

(51) Int. Cl.
  *G01N 21/64* (2006.01)
  *G01J 3/44* (2006.01)
  (Continued)

(52) U.S. Cl.
  CPC ............ *G01J 3/4406* (2013.01); *G01N 21/64* (2013.01); *G06F 3/14* (2013.01); *G06V 10/143* (2022.01); *H04N 5/2256* (2013.01)

(58) Field of Classification Search
  CPC ........ H04N 5/2256; G06F 3/14; G01N 21/64; G06V 10/143; G01J 3/4406
  See application file for complete search history.

(56) References Cited

U.S. PATENT DOCUMENTS 6,806,455 B2 * 10/2004 Zarate ................ G01N 21/6408
                                                      250/573

FOREIGN PATENT DOCUMENTS

JP   2012117816 A   6/2012
JP   2019020362 A   2/2019

OTHER PUBLICATIONS

The Japan Society for Analytical Chemistry, "Bunseki Kagaku," vol. 58, No. 6, pp. 553-559, 2009 (English Abstract included).

(Continued)

*Primary Examiner* — David P Porta
*Assistant Examiner* — Fani Boosalis
(74) *Attorney, Agent, or Firm* — Holland & Hart LLP

(57) ABSTRACT

A method of obtaining a quantum efficiency distribution in a predetermined sample surface, including: irradiating a reference material with excitation light belonging to a first wavelength range; obtaining the reference material's image, which includes a first channel for the first wavelength range and a second channel for a second wavelength range, the first and the second channel's irradiation luminance value in each pixel; irradiating the predetermined sample surface with the excitation light; obtaining the first and the second channel's measurement luminance value in each pixel of the image of the predetermined surface; calculating an absorption luminance value from a difference between the first (Continued)

channel's irradiation luminance value and measurement luminance value; calculating a fluorescence luminance value from difference between the second channel's irradiation luminance value and measurement luminance value; calculating quantum efficiency of each pixel based on the values; and obtaining quantum efficiency distribution.

26 Claims, 21 Drawing Sheets

(51) Int. Cl.
  *G06F 3/14* (2006.01)
  *H04N 5/225* (2006.01)
  *G06V 10/143* (2022.01)

(56) References Cited

OTHER PUBLICATIONS

Ohkubo et al., "Absolute Fluorescent Quantum Efficiency of NBS Phosphor Standard Samples," J.Ilium, Engng. Inst. Jpn. vol. 83 No. 2, pp. 87-93, 1999 (English Abstract included).
Zhao et al., "Spatial mapping of fluorophore quantum yield in diffusive media", Journal of Biomedical Optics, Aug. 2015 (8 pages).
Fu et al., "Reflectance and Fluorescence Spectral Recovery via Actively Lit RGB Images", IEEE Transactions On Pattern Analysis and Machine Intelligence, 2015 (14 pages).
ISO 20351, "Fine ceramics (advanced ceramics, advanced technical ceramics)—Absolute measurement of internal quantum efficiency of phosphors for white light emitting diodes using an integrating sphere", downloaded Dec. 8, 2021 (18 pages).

\* cited by examiner

FORM SPECTRUM BY USING IMAGES OF SAME PLACE AT PLURALITY OF WAVELENGTHS WITH RESPECT TO COEFFICIENT $a'_k$ OR COEFFICIENT $R_k$, WHICH IS CALCULATED FROM LUMINANCE VALUES OF EACH PIXEL.

METHOD OF OBTAINING QUANTUM EFFICIENCY DISTRIBUTION, METHOD OF DISPLAYING QUANTUM EFFICIENCY DISTRIBUTION, PROGRAM FOR OBTAINING QUANTUM EFFICIENCY DISTRIBUTION, PROGRAM FOR DISPLAYING QUANTUM EFFICIENCY DISTRIBUTION, FLUORESCENCE SPECTROPHOTOMETER, AND DISPLAY DEVICE

CROSS REFERENCE TO RELATED APPLICATION(S)

This application claims the benefit of Japanese Patent Application No. 2019-159440, filed Sep. 2, 2019, which is hereby incorporated by reference in its entirety into this application.

BACKGROUND OF THE INVENTION

1. Field of the Invention

The present invention relates to a method of obtaining a quantum efficiency distribution, a method of displaying a quantum efficiency distribution, a program for obtaining a quantum efficiency distribution, a program for displaying a quantum efficiency distribution, a fluorescence spectrophotometer, and a display device.

2. Description of the Related Art

In recent years, efforts to enhance the efficiency of fluorescent materials used in displays and white-light emitting diode light sources are being made with the aim of obtaining displays and white-light emitting diode light sources that are energy-saving. Measurement of fluorescence quantum efficiency (quantum yield) in a solid state is said to be useful for evaluation of the light emission efficiency of those fluorescent materials.

In ISO 20351 (2017): Fine ceramics (advanced ceramics, advanced technical ceramics)—Absolute measurement of internal quantum efficiency of phosphors for white light emitting diodes using an integrating sphere (JIS R 1697) and Horigome, J., Wakui, T. et al., Bunseki Kagaku (Japan Analyst), Volume 58, Issue 6, 2009, pp. 553-559, there are disclosed fluorescence spectrophotometers for quantum efficiency measurement. Fluorescence spectrophotometers of this type are generally devices that irradiate a sample with excitation light to measure fluorescent light emitted from the sample.

Quantum efficiency is known to be classified into external quantum efficiency and internal quantum efficiency. External quantum efficiency is the proportion of the number of photons of emitted fluorescent light to the number of photons of excitation light irradiating a fluorescent material, whereas internal quantum efficiency is the proportion of the number of photons of emitted fluorescent light to the number of photons of excitation light absorbed by a fluorescent material. The number of photons of the excitation light absorbed by the fluorescent material is obtained by removing a component that is reflected by the fluorescent material from the excitation light irradiating the fluorescent material.

ISO 20351 (2017) (corresponds to JIS R 1697 as well) and Ohkubo, K. and Shigeta, T., Journal of the Illuminating Engineering Institute of Japan, Volume 83, Issue 2, 1999, pp. 87-93 define internal quantum efficiency by Expression (1) below.

$$\text{Internal quantum efficiency} = \frac{\text{Relative value of fluorescence photon count (fluorescence amount)}}{\text{Relative value of absorbed photon count (absorption amount)}} \quad (1)$$

Ohkubo, K. and Shigeta, T., Journal of the Illuminating Engineering Institute of Japan, Volume 83, Issue 2, 1999, pp. 87-93 defines external quantum efficiency by Expression (2) below.

$$\text{External quantum efficiency} = \frac{\text{Relative value of fluorescence photon count (fluorescence amount)}}{\text{Relative value of irradiating photon count (irradiation amount)}} \quad (2)$$

The relative value of the absorbed photon count (absorption amount) and the relative value of the fluorescence photon count (fluorescence amount) for calculating internal quantum efficiency, and the relative value of the irradiating photon count (irradiation amount) and the relative value of the fluorescence photon count (fluorescence amount) for calculating external quantum efficiency are obtained by the fluorescence spectrum measurement described above.

For the relative value of the absorbed photon count in internal quantum efficiency, a spectrum component of a fluorescent material sample is subtracted from a measured spectrum of excitation light, to thereby extract an excitation light spectrum component in the measurement sample. The relative value of the number of photons absorbed by the fluorescent material sample (the absorption amount) is obtained by integrating this spectrum based on an irradiation wavelength of the excitation light.

For the relative value of the irradiating photon count in external quantum efficiency, the relative value of the number of photons irradiating the sample (the irradiation amount) is obtained by integrating spectra in a wavelength range of the measured spectrum of excitation light.

For the relative value of the fluorescence photon count, the spectrum of excitation light is subtracted from a measured spectrum component of the fluorescent material sample, and spectra in a wavelength range in which fluorescent light is generated are integrated, to thereby obtain the relative value of the number of fluorescent photons emitted from the sample (the fluorescence amount).

The relative value of the obtained absorbed photon count (absorption amount) and the relative value of the fluorescence photon count (fluorescence amount) are used to calculate the internal quantum efficiency by Expression (1). The obtained relative value of the irradiating photon count (irradiation amount) and the obtained relative value of the fluorescence photon count (fluorescence amount) are used to calculate the external quantum efficiency by Expression (2).

In Japanese Patent Application Laid-open No. 2012-117816, there is reported a quantum yield measurement device including a moving mechanism for moving an integrating sphere. In this quantum yield measurement device, the moving mechanism moves the integrating sphere inside a dark box to switch between a state in which a sample container of a sample cell is located inside the integrating sphere and a state in which the sample container of the sample cell is located outside the integrating sphere.

This is a mechanism for switching to a different sample placement state as a measure of correcting multiple reflection inside the integrating sphere in order to improve the precision of quantum yield measurement, and the only data obtained is a quantum yield that is obtained from average spectrum information at a measurement site.

In Journal of Biomedical Optics; August 2015, Vol. 20(8), an image of a quantum efficiency distribution is obtained by performing spatial frequency domain imaging (SFDI), which is a wide-field diffuse optical technique, on an image taken of the distribution of fluorescent light that is generated from excitation light of a single wavelength, and thus taking into account the effect of scattering and reflection.

According to Japanese Patent Application Laid-open No. 2019-020362, on the other hand, an image of fluorescent light of a sample can be taken with fluorescent light that is generated from the sample at the time of irradiation with excitation light, by providing a camera module (a photographing device) in the vicinity of an integrating sphere in a fluorescence spectrophotometer.

In Y. Fu, A. Lam, I. Sato, T. Okabe and Y. Sato, IEEE Trans. PA MI 38(7), pp. 1313-1326, 2016, there is disclosed a method of separating images of reflection and fluorescence absorption from an RGB image taken with the use of a light source capable of irradiation at multiple wavelengths and a color camera, and estimating an absorption spectrum and a fluorescence spectrum.

In a fluorescence spectrophotometer system of the related art, as those disclosed in, ISO 20351 (2017); Horigome, J., Wakui, T. et al., Bunseki Kagaku (Japan Analyst), Volume 58, Issue 6, 2009, pp. 553-559; Ohkubo, K. and Shigeta, T., Journal of the Illuminating Engineering Institute of Japan, Volume 83, Issue 2, 1999, pp. 87-93; and Japanese Patent Application Laid-open No. 2012-117816, quantum efficiency is calculated by measuring an excitation light spectrum with the use of a reference white plate and measuring a fluorescence spectrum of light from a sample. However, the site of the spectrum measurement is on an irradiated surface irradiated with excitation light, which limits the calculated quantum efficiency to an average value on the irradiated surface.

In Journal of Biomedical Optics; August 2015, Vol. 20 (8), quantum efficiency is calculated from a sample image, but the method of the calculation is relative comparison to a sample whose quantum efficiency is known, for example, rhodamine B. Preparation of an appropriate known sample is required, and then the measurement value varies depending on the quantum efficiency of the known sample.

The number of samples whose quantum efficiencies are known is limited, and it is therefore not easy to prepare a known sample suitable for the state of a sample, which may be a liquid sample, a solid sample, or a sample in other states. In the case of a solution sample whose quantum efficiency varies depending on the concentration of the sample, the concentration at which the quantum efficiency is reported is generally low, and the fluorescence amount is small in many dilute solutions. This leads to a troublesome operation of selecting a sample that has a fluorescence amount suitable for photographing, and diluting the sample to a concentration at which the quantum efficiency is kept constant within the range of the reported value and at which an image can be taken. Solid samples are also limited in the number of samples whose quantum efficiencies are known, and the limited number causes a troublesome operation of selecting a known sample suitable for the excitation wavelength and fluorescence wavelength of a sample. A method of obtaining quantum efficiency from an image of a sample without using a sample whose quantum efficiency is known, that is, an absolute method of obtaining quantum efficiency, is therefore desired.

In Y. Fu, A. Lam, I. Sato, T. Okabe and Y. Sato, IEEE Trans. PA MI 38(7), pp. 1313-1326, 2016, there is a description about a method of separating a reflection component image and a fluorescence absorption component image from an RGB image that is taken with a color camera, and estimating an absorption spectrum and a fluorescence spectrum, but no description about quantum efficiency calculation. It is required for an absolute calculation of the quantum efficiency to obtain an absorption amount (irradiation amount) and a fluorescence amount that accurately indicate how much of absorbed light is turned into the emitted fluorescent light. In the case of a solid sample, in particular, the reflection state is uneven in specular reflection and diffuse reflection on a sample surface, and an error due to dependence on the installation angles of lighting and a camera is consequently caused in an estimation of the amount of reflected light. A possible way of removing this effect is to create a state in which illumination is diffused by using an integrating sphere as in Japanese Patent Application Laid-open No. 2019-020362. In Japanese Patent Application Laid-open No. 2019-020362, however, there is no description about quantum efficiency calculation, whereas measurement of an excitation spectrum and a fluorescence spectrum and photographing with a camera are described. Unlike Y. Fu, A. Lam, I. Sato, T. Okabe and Y. Sato, IEEE Trans. PA MI 38(7), pp. 1313-1326, 2016, in Japanese Patent Application Laid-open No. 2019-020362, there are used, for illumination, excitation light that is separated at an excitation side spectroscope and then leaves a fluorescence spectrophotometer, and an integrating sphere for sample placement and photographing with a color camera. The two accordingly differ from each other in optical geometry, and it is therefore not easy to simply derive a calculated quantum efficiency from an RGB image taken with a color camera, based on In Y. Fu, A. Lam, I. Sato, T. Okabe and Y. Sato, IEEE Trans. PA MI 38(7), pp. 1313-1326, 2016.

Another factor to consider is that, as mentioned in ISO 20351 (2017), an excitation side optical system and fluorescent light side optical system of a fluorescence spectrophotometer have spectral characteristics unique to the optical systems. With the excitation side optical system having spectral characteristics, the amount of excitation light irradiating a sample varies from wavelength to wavelength. Similarly, with the fluorescent light side optical system having spectral sensitivity characteristics, an intensity detected for fluorescent light that is emitted from a sample varies depending on the wavelength. Methods of correcting the spectral characteristics of the excitation side optical system and fluorescent light side optical system are well known, and any method is used to obtain instrumental functions in advance and execute spectral sensitivity correction. However, there has been no report on a method of correcting spectral sensitivity characteristics of a camera included in an integrating sphere of a fluorescence spectrophotometer. An image taken with the use of the integrating sphere is therefore affected by spectral characteristics of the excitation side optical system and of the integrating sphere. Thus, it becomes difficult to obtain an absorption amount (irradiation amount) and a fluorescence amount that accurately indicate how much of absorbed light is turned into the emitted fluorescent light.

SUMMARY OF THE INVENTION

The present invention relates to a technology of grasping distributions of internal quantum efficiency and external quantum efficiency in an observed surface of a sample.

According to at least one aspect of the present invention, there is provided a method of obtaining a quantum efficiency distribution in a predetermined surface of a sample, including: irradiating a reference material with excitation light that belongs to a first wavelength range; obtaining, by taking an image of the reference material with a photographing device, which includes, at least, a first channel corresponding to the first wavelength range and a second channel corresponding to a second wavelength range, an irradiation luminance value of the first channel and an irradiation luminance value of the second channel in each pixel of the image of the reference material; irradiating the predetermined surface of the sample with the excitation light; obtaining, by taking an image of the predetermined surface with the photographing device, a measurement luminance value of the first channel and a measurement luminance value of the second channel in each pixel of the image of the predetermined surface; calculating an absorption luminance value from a difference between the irradiation luminance value of the first channel and the measurement luminance value of the first channel; calculating a fluorescence luminance value from a difference between the irradiation luminance value of the second channel and the measurement luminance value of the second channel; calculating a quantum efficiency of each pixel based on the irradiation luminance values, the absorption luminance value, and the fluorescence luminance value; and obtaining, from the quantum efficiency of each pixel, the quantum efficiency distribution in the predetermined surface of the sample.

According to at least one aspect of the present invention, there is provided a method of obtaining a quantum efficiency distribution in a predetermined surface of a sample, including: irradiating a reference material with excitation light; obtaining, by taking an image of the reference material with a photographing device, for each wavelength, an irradiation luminance value in each pixel of the image of the reference material; irradiating the predetermined surface of the sample with the excitation light; obtaining, by taking an image of the predetermined surface with the photographing device to obtain, for each wavelength, a measurement luminance value in each pixel of the image of the predetermined surface; obtaining a fluorescence spectrum that is obtained from irradiation with the excitation light; calculating, based on the fluorescence spectrum, fluorescence intensity distribution data about a fluorescence intensity distribution to be assigned to each fluorescence wavelength; calculating, based on the irradiation luminance value and the measurement luminance value, which are obtained for each wavelength in each pixel, and on the fluorescence intensity distribution data, a reflection component coefficient and a fluorescence component coefficient in the pixel; calculating, based on the reflection component coefficient and the fluorescence component coefficient, a quantum efficiency of each pixel; and obtaining, from the quantum efficiency of each pixel, the quantum efficiency distribution in the predetermined surface of the sample.

According to at least one aspect of the present invention, there is provided a method of displaying a quantum efficiency distribution, including displaying, on a display device, a quantum efficiency distribution that is obtained by the above-mentioned method of obtaining a quantum efficiency distribution, on a coordinate system corresponding to the predetermined surface.

According to at least one aspect of the present invention, there is provided a program for obtaining a quantum efficiency distribution in a predetermined surface of a sample, the predetermined surface of the sample being irradiated with excitation light that belongs to a first wavelength range by a fluorescence spectrophotometer, the fluorescence spectrophotometer being configured to irradiate a reference material with the excitation light as well as the predetermined surface of the sample, the program controlling a computer so that the computer executes the steps of: obtaining, by taking an image of the reference material with a photographing device, which includes, at least, a first channel corresponding to the first wavelength range and a second channel corresponding to a second wavelength range, an irradiation luminance value of the first channel and an irradiation luminance value of the second channel in each pixel of the image of the reference material; obtaining, by taking an image of the predetermined surface with the photographing device, a measurement luminance value of the first channel and a measurement luminance value of the second channel in each pixel of the image of the predetermined surface; calculating an absorption luminance value from a difference between the irradiation luminance value of the first channel and the measurement luminance value of the first channel; calculating a fluorescence luminance value from a difference between the irradiation luminance value of the second channel and the measurement luminance value of the second channel; calculating a quantum efficiency of each pixel based on the irradiation luminance values, the absorption luminance value, and the fluorescence luminance value; and obtaining, from the quantum efficiency of each pixel, the quantum efficiency distribution in the predetermined surface of the sample.

According to at least one aspect of the present invention, there is provided a program for obtaining a quantum efficiency distribution in a predetermined surface of a sample, the predetermined surface of the sample being irradiated with excitation light by a fluorescence spectrophotometer, the fluorescence spectrophotometer being configured to irradiate a reference material with the excitation light as well as the predetermined surface of the sample, the program controlling a computer so that the computer executes the steps of: obtaining, by taking an image of the reference material with a photographing device, for each wavelength, an irradiation luminance value in each pixel of the image of the reference material; obtaining, by taking an image of the predetermined surface with the photographing device, for each wavelength, a measurement luminance value in each pixel of the image of the predetermined surface; obtaining a fluorescence spectrum that is obtained from irradiation with the excitation light; calculating, in the fluorescence spectrum, fluorescence intensity distribution data about a fluorescence intensity distribution to be assigned to each excitation wavelength; calculating, based on the irradiation luminance value and the measurement luminance value, which are obtained for each wavelength in each pixel, and on the fluorescence intensity distribution data, a reflection component coefficient and a fluorescence component coefficient in the pixel; calculating, based on the reflection component coefficient and the fluorescence component coefficient, a quantum efficiency of each pixel; and obtaining, from the quantum efficiency of each pixel, the quantum efficiency distribution in the predetermined surface of the sample.

According to at least one aspect of the present invention, there is provided a program for displaying a quantum efficiency distribution, the program controlling a display device so that the display device displays a quantum efficiency distribution obtained by the above-mentioned program for obtaining a quantum efficiency distribution, on a coordinate system corresponding to the predetermined surface.

According to at least one aspect of the present invention, there is provided a fluorescence spectrophotometer, which is configured to obtain a quantum efficiency distribution in a predetermined surface of a sample, including: a light source configured to irradiate a reference material and the predetermined surface of the sample with excitation light that belongs to a first wavelength range; a photographing device including, at least, a first channel, which corresponds to the first wavelength range, and a second channel, which corresponds to a second wavelength range; and a computer. In the fluorescence spectrophotometer, the photographing device is configured to obtain, by taking an image of the reference material, an irradiation luminance value of the first channel and an irradiation luminance value of the second channel in each pixel of the image of the reference material, and is configured to obtain, by taking an image of the predetermined surface, a measurement luminance value of the first channel and a measurement luminance value of the second channel in each pixel of the image of the predetermined surface. Further, in the fluorescence spectrophotometer, the computer is configured to: calculate an absorption luminance value from a difference between the irradiation luminance value of the first channel and the measurement luminance value of the first channel; calculate a fluorescence luminance value from a difference between the irradiation luminance value of the second channel and the measurement luminance value of the second channel; calculate a quantum efficiency of each pixel based on the irradiation luminance values, the absorption luminance value, and the fluorescence luminance value; and obtain the quantum efficiency distribution in the predetermined surface of the sample from the quantum efficiency of each pixel.

According to at least one aspect of the present invention, there is provided a fluorescence spectrophotometer, which is configured to obtain a quantum efficiency distribution in a predetermined surface of a sample, including: a light source configured to irradiate a reference material and the predetermined surface of the sample with excitation light; a photographing device; a detector configured to obtain a fluorescence spectrum that is obtained from irradiation with the excitation light; and a computer. In the fluorescence spectrophotometer, the photographing device is configured to obtain, by taking an image of the reference material, for each wavelength, an irradiation luminance value in each pixel of the image of the reference material, and is configured to obtain, by taking an image of the predetermined surface, for each wavelength, a measurement luminance value in each pixel of the image of the predetermined surface. Further, in the fluorescence spectrophotometer, the computer is configured to: calculate, in the fluorescence spectrum, fluorescence intensity distribution data about a fluorescence intensity distribution to be assigned to each excitation wavelength; calculate, based on the irradiation luminance value and the measurement luminance value, which are obtained for each wavelength in each pixel, and on the fluorescence intensity distribution data, a reflection component coefficient and a fluorescence component coefficient in the pixel; calculate, based on the reflection component coefficient and the fluorescence component coefficient, a quantum efficiency of each pixel; and obtain, from the quantum efficiency of each pixel, the quantum efficiency distribution in the predetermined surface of the sample.

According to at least one aspect of the present invention, there is provided a display device, which is configured to display a quantum efficiency distribution that is obtained by the above-mentioned fluorescence spectrophotometer, on a coordinate system corresponding to the predetermined surface.

According to the present invention, the distribution of the quantum efficiency in the predetermined surface of the sample can be grasped, which enables the more detailed analysis of the properties of the sample.

BRIEF DESCRIPTION OF THE DRAWINGS

FIG. 3A and FIG. 3B are views for illustrating an example of a configuration of an integrating sphere, of which FIG. 3A is a top view thereof and FIG. 3B is a side view thereof.

FIG. 5A, FIG. 5B, and FIG. 5C are conceptual graphs for showing relationships between an irradiation luminance value, an absorption luminance value, and a fluorescence luminance value in an R channel, a G channel, and a B channel in the first embodiment, of which FIG. 5A is a graph of irradiation luminance values in reference measurement, FIG. 5B is a graph of luminance values in sample measurement, and FIG. 5C is a graph of calculated absorption luminance value and fluorescence luminance values.

FIG. 6A, FIG. 6B, and FIG. 6C are conceptual graphs of fluorescence spectra for illustrating R-channel, G-channel, and B-channel wavelength ranges of a reference white plate and a sample in the fluorescence spectra, of which FIG. 6A is a graph of a spectrum in reference measurement, FIG. 6B is a graph of a spectrum in sample measurement, and FIG. 6C is a graph of a spectrum of a calculated absorption amount and fluorescence amount.

FIG. 8A and FIG. 8B are views for illustrating another example of the configuration of the integrating sphere, of which FIG. 8A is a top view thereof and FIG. 8B is a side view thereof.

FIG. 15A, FIG. 15B, and FIG. 15C are conceptual graphs for showing relationships between an irradiation luminance value, an absorption luminance value, and a fluorescence luminance value in a multi-channel in the third embodiment, of which FIG. 15A is a graph of irradiation luminance values in reference measurement, FIG. 15B is a graph of luminance values in sample measurement, and FIG. 15C is a graph of calculated absorption luminance values and fluorescence luminance values.

DESCRIPTION OF THE EMBODIMENTS

A detailed description is given below with reference to the drawings on exemplary embodiments of a method of obtaining a quantum efficiency distribution and a method of displaying a quantum efficiency distribution according to the present invention, a program for obtaining a quantum efficiency distribution and a program for displaying a quantum efficiency distribution, which are used to carry out those methods, a fluorescence spectrophotometer, and a display device.

Figure 1:
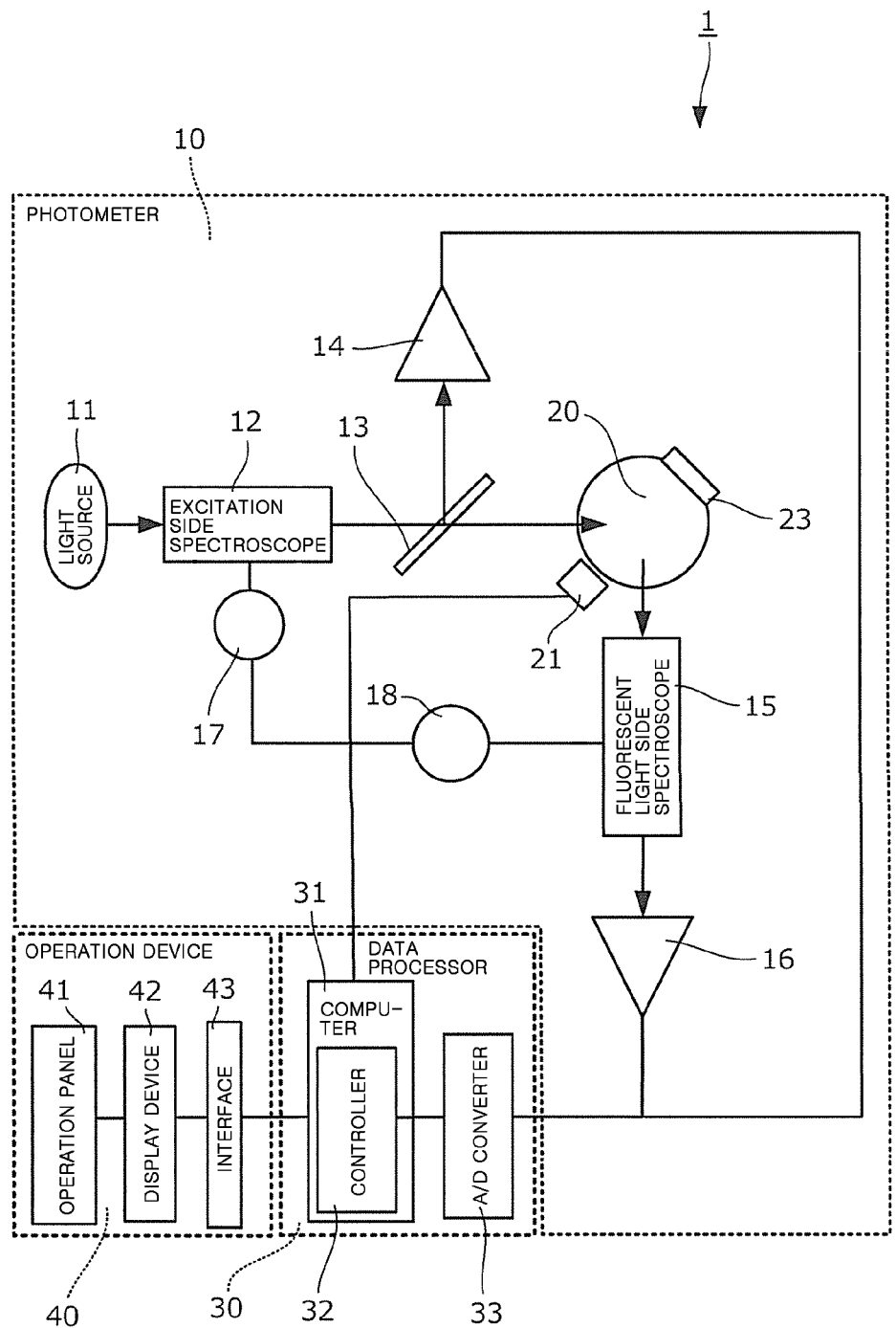
FIG. 1 is a block diagram for illustrating a configuration of a fluorescence spectrophotometer according to at least one embodiment of the present invention.

FIG. 1 is a block diagram for illustrating a configuration of a fluorescence spectrophotometer according to at least one embodiment of the present invention, with which a quantum efficiency distribution is obtained. The configuration of the fluorescence spectrophotometer according to this embodiment is described in detail with reference to FIG. 1.

A fluorescence spectrophotometer 1 according to this embodiment is a device configured to irradiate a sample with excitation light to measure fluorescent light emitted from the sample, and includes a photometer 10, a data processor 30, which is arranged in the photometer 10, and is configured to control the photometer 10 to analyze the sample, and an operation device 40, which is used for input and output.

The photometer 10 includes a light source 11, an excitation side spectroscope 12, which is configured to separate light from the light source 11 to generate the excitation light, a beam splitter 13, which is configured to separate light from the excitation side spectroscope 12, a monitor detector 14, which is configured to measure an intensity of a partial light that is separated by the beam splitter 13, a fluorescent light side spectroscope 15, which is configured to separate the fluorescent light emitted from the sample into monochromatic light, a detector (fluorescence detector) 16, which is configured to detect an electrical signal of the monochromatic fluorescent light, an excitation side pulse motor 17, which is configured to drive a diffraction grating of the excitation side spectroscope 12, and a fluorescent light side pulse motor 18, which is configured to drive a diffraction grating of the fluorescent light side spectroscope 15.

The data processor 30 includes a computer 31, a controller 32, which is arranged in the computer 31, and an A/D converter 33 configured to convert the fluorescent light from the sample into a digital signal. Moreover, the operation device 40 includes an operation panel 41, to which an operator inputs an input signal that is required for processing by the computer 31, a display device 42, which is configured to display various analysis results processed by the computer 31, and an interface 43, which is configured to connect the operation panel 41 and the display device 42 to the computer 31.

Based on measurement conditions input to the operation panel 41 by the operator, the computer 31 outputs a signal to the excitation side pulse motor 17, and the excitation side pulse motor 17 is driven to set the excitation side spectroscope 12 to a target wavelength position. Similarly, based on the measurement conditions, the computer 31 outputs a signal to the fluorescent light side pulse motor 18, and the fluorescent light side pulse motor 18 is driven to set the fluorescent light side spectroscope 15 to a target wavelength position. Each of the excitation side spectroscope 12 and the fluorescent light side spectroscope 15 has a diffraction grating having a predetermined slit width, a prism, and other such optical elements, and the optical elements are moved to rotate with the excitation side pulse motor 17 and the fluorescent light side pulse motor 18 serving as powers via gears, cams, and other such drive system parts to enable spectral scanning.

The photometer 10 further includes an integrating sphere 20. The integrating sphere 20 exhibits a substantially spherical shape with no substance existing inside thereof to define an interior space. Moreover, the integrating sphere 20 includes a sample holder (sample placement portion) 23, in which a sample to be measured, which takes various forms, such as solid, powder, and liquid can be placed and held (contained or enclosed). The sample holder 23 is configured to be removable from the integrating sphere 20, exhibits a circular plate shape, and holds the sample with spring stress.

Further, in this embodiment, a camera module (photographing device) 21 is provided in the vicinity of the integrating sphere 20. In contrast to the detector 16, which is configured to detect the electrical signal of the fluorescent light from the sample to obtain an intensity of a spectrum, the camera module 21 is configured to photograph and obtain a sample image (image of a sample surface) with the fluorescent light from the sample. In this embodiment, the sample holder 23 is placed at a position at which the sample is not directly irradiated with the partial excitation light that is separated by the beam splitter 13. Meanwhile, the camera module 21 is placed at a position that is opposite to (including the vicinity of the position that is opposite to) the position of the sample holder 23 when viewed from a center of the integrating sphere 20 to photograph the surface of the sample based on the fluorescent light emitted by the sample irradiated with the light from the light source 11.

The integrating sphere 20 takes in the partial excitation light that is separated by the beam splitter 13. On an inner surface (that defines the interior space) of the integrating sphere 20, a highly reflective white material, for example, barium sulfate, is applied. The integrating sphere 20 reflects and scatters, on the inner surface, the excitation light that has entered the integrating sphere 20 to irradiate the sample held in the sample holder 23 with averaged excitation light. Further, the fluorescent light emitted from the sample is reflected and scattered by the inner surface of the integrating sphere 20, exits from the integrating sphere, and is guided to the fluorescent light side spectroscope 15 and the detector 16. Details of the integrating sphere 20 are described later.

The emitted fluorescent light is taken in by the fluorescent light side spectroscope 15 and separated into the monochromatic light, and the monochromatic light is detected by the detector 16 and taken in as a signal intensity by the computer 31 via the A/D converter 33, with the result that the various analysis results are displayed on the display device 42. Meanwhile, the emitted fluorescent light is photographed by the camera module 21, with the result that the sample image is obtained and displayed on the display device 42.

Figure 2:
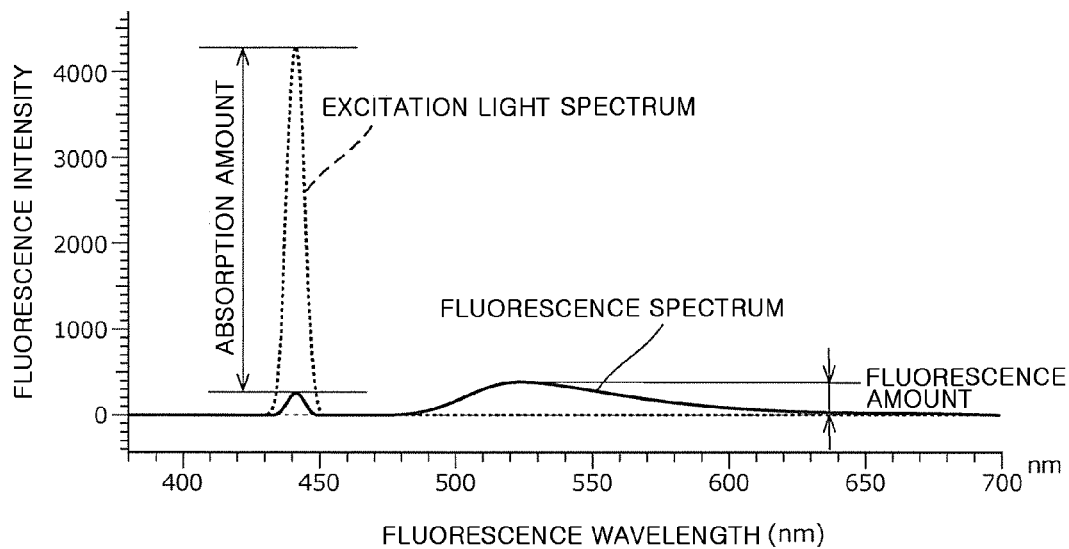
FIG. 2 is a graph for showing a sample's fluorescence spectrum obtained with the fluorescence spectrophotometer.

FIG. 2 is a graph for showing a fluorescence spectrum, which is an example of data that is obtained from general fluorescence spectrophotometers including the fluorescence spectrophotometer according to the embodiment of FIG. 1. The fluorescence spectrum is, in the device of FIG. 1, a spectrum obtained by irradiating a measurement sample in the sample holder 23 with excitation light of a fixed wavelength, and measuring the fluorescence intensity for each fluorescence wavelength when the fluorescence wavelength is changed. The measurement sample is irradiated with excitation light from the excitation side spectroscope 12 that is set to a fixed wavelength. The fluorescent light side spectroscope 15 causes changes in the wavelength of fluorescent light to be measured at the time from a measurement start wavelength to a measurement end wavelength, and a change in fluorescent light at each wavelength is detected by the detector 16 and taken in as a signal intensity by the computer 31 via the A/D converter 33. The computer 31 performs analysis processing on the signal intensity to display a spectrum on the display device 42 via the interface 43. A two-dimensional fluorescence spectrum expressed in fluorescence wavelength and fluorescence intensity, such as the one shown in FIG. 2, is displayed on the display device 42 as a measurement result. The spectrum of FIG. 2 indicates the fluorescence intensity obtained when the excitation light has a particular wavelength (for example, 440 nm) and the fluorescence wavelength is changed.

To measure an excitation light spectrum, a reference white plate, for example, is placed as a reference material in the sample holder 23 of the integrating sphere 20. Excitation light of a selected wavelength is radiated from an excitation light introducing opening portion of the integrating sphere 20 toward the reference white plate, to measure the intensity of light exiting a measurement light opening portion. The excitation light is set to an intensity that avoids saturation of a signal of the detector 16. The dotted line in FIG. 2 represents the spectrum of the excitation light.

To measure the spectrum of a fluorescent material sample next, the sample is placed in the sample holder 23 of the integrating sphere 20. In the same manner as in the measurement of the excitation light spectrum, the sample is irradiated with excitation light and the detector measures the light intensity to obtain a spectrum that includes scattering light of the excitation light and fluorescent light. The solid line in FIG. 2 represents the fluorescence spectrum of the fluorescent material sample.

The ratio of a fluorescence amount equivalent to the area of the fluorescence spectrum and an absorption amount equivalent to the area of the excitation light spectrum corresponds to an internal quantum efficiency obtained by Expression (1). The ratio of a fluorescence amount equivalent to the area of the fluorescence spectrum and an irradiation amount (not an absorption amount) of the excitation light is an external quantum efficiency obtained by Expression (2).

Figure 3A:
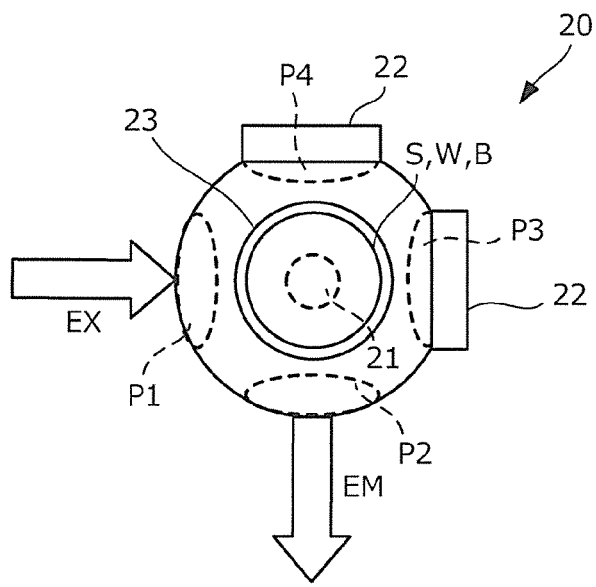
Figure 3B:
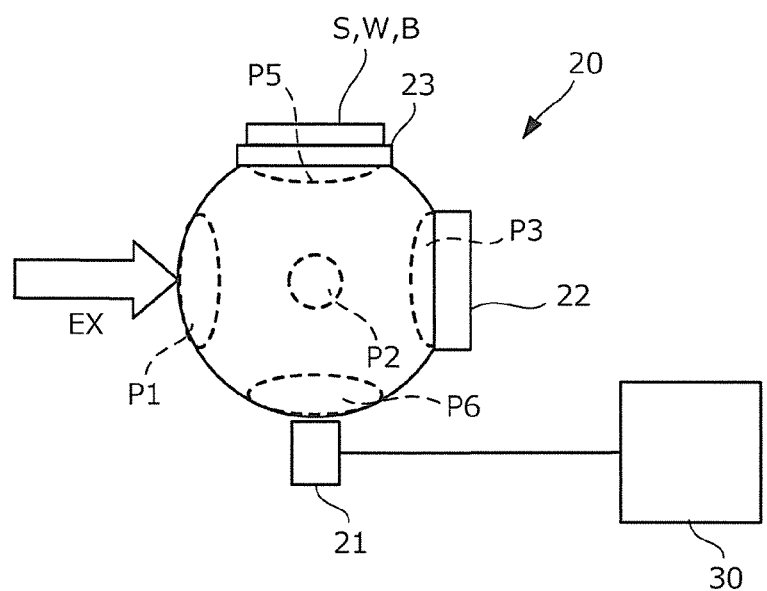

FIG. 3A and FIG. 3B are views for illustrating the details of the integrating sphere 20 in this embodiment, of which FIG. 3A is a top view of the integrating sphere 20, and FIG. 3B is a side view of the integrating sphere 20. In the integrating sphere 20 in this example, six ports (holes) P1 to P6, which pierce an outer surface and the inner surface of the integrating sphere 20, are formed. The port P1 and the port P3, the port P2 and the port P4, and the port P5 and the port P6 are formed at positions opposite to each other with a center point of the sphere being interposed therebetween. Nothing is provided on the port P1 at a position that is opposed to the beam splitter 13, and the excitation light that is generated in the excitation side spectroscope 12 and separated by the beam splitter 13 is allowed to pass through the port P1. The sample holder 23 holding a sample S is mounted on the port P5. Each of the ports P3 and P4 is closed with a white plate 22, which is formed of, for example, a highly reflective white material (for example, the same material as that of the inner surface of the integrating sphere 20) to form a part of the inner surface of the integrating sphere 20. To suppress a reduction in amount of light, which is caused by the excitation light and the fluorescent light escaping through openness, the port P4, which is opposite to the port P2, is desirably, but not necessarily, closed with the white plate 22. Nothing is provided on the port P2 at a position that is opposed to the fluorescent light side spectroscope 15, and the port P6 at a position that is opposed to the camera module 21.

In this configuration, when the excitation light is allowed to enter from the port P1, the excitation light is scattered and reflected (diffusely reflected) by the inner surface of the integrating sphere 20, and the interior space of the integrating sphere 20 is filled with the excitation light. Then, there is arranged the port P2 configured to extract the fluorescent light in a direction of 90 degrees with respect to a direction of incidence of the excitation light that has entered from the port P1, and the fluorescent light emitted from the sample in the sample holder 23 passes through the port P2 to be guided to the fluorescent light side spectroscope 15, in which the spectrum is measured.

Moreover, the sample holder 23 holding the sample is placed at a position of the port P5, which is a position that is not directly irradiated with the excitation light. The camera module 21 is placed to be opposed to the port P6, which is located opposite to the port P5, that is, the sample holder 23. The camera module 21 is formed of such a lens that is focused on the sample S, a stop for adjusting an amount of light, a long-pass filter configured to cut unnecessary light, a photographing element, and other such components. The camera module 21 is controlled by the computer 31 of the data processor 30. As long as the condition that the sample in the sample holder 23 is not directly irradiated with the excitation light is satisfied, a configuration, the number, and the like of the ports of the integrating sphere 20 are not limited to those illustrated in FIG. 3A and FIG. 3B. Moreover, diameters of the ports are all the same in this embodiment, but are not necessarily required to be the same. Moreover, it is preferred that the white plate 22 have such a size that does not allow ambient light to enter the integrating sphere from the port to which the white plate 22 is mounted. A configuration of the sample holder 23 is also not particularly limited. The material of the inner surface of the integrating sphere 20 is also not particularly limited, but is preferred to be formed of a material having a high reflection component coefficient.

A method of obtaining a quantum efficiency distribution according to a first embodiment of the present invention is described next. The method of obtaining a quantum efficiency distribution according to the first embodiment is a method of obtaining a quantum efficiency distribution state in a predetermined surface of a sample by calculating an absorption amount distribution and a fluorescence amount distribution from RGB luminance values of each pixel in an image taken of the sample.

The measurement is performed with the use of, for example, the fluorescence spectrophotometer 1 having mounted therein the integrating sphere 20 and the camera module (photographing device) 21, which have configurations illustrated in FIG. 1, and FIG. 3A and FIG. 3B. The excitation side optical system and the fluorescent light side optical system each have spectral characteristics unique to optical systems themselves. With the excitation side optical system having spectral characteristics, the amount of excitation light irradiating a sample varies from wavelength to wavelength. With the fluorescent light side optical system having spectral sensitivity characteristics, an intensity detected for fluorescent light that is emitted from a sample varies depending on the wavelength. Methods of correcting the spectral characteristics of the excitation side optical system and fluorescent light side optical system are well known, and any method is used to obtain instrumental functions in advance and execute spectral sensitivity correction.

Figure 4:
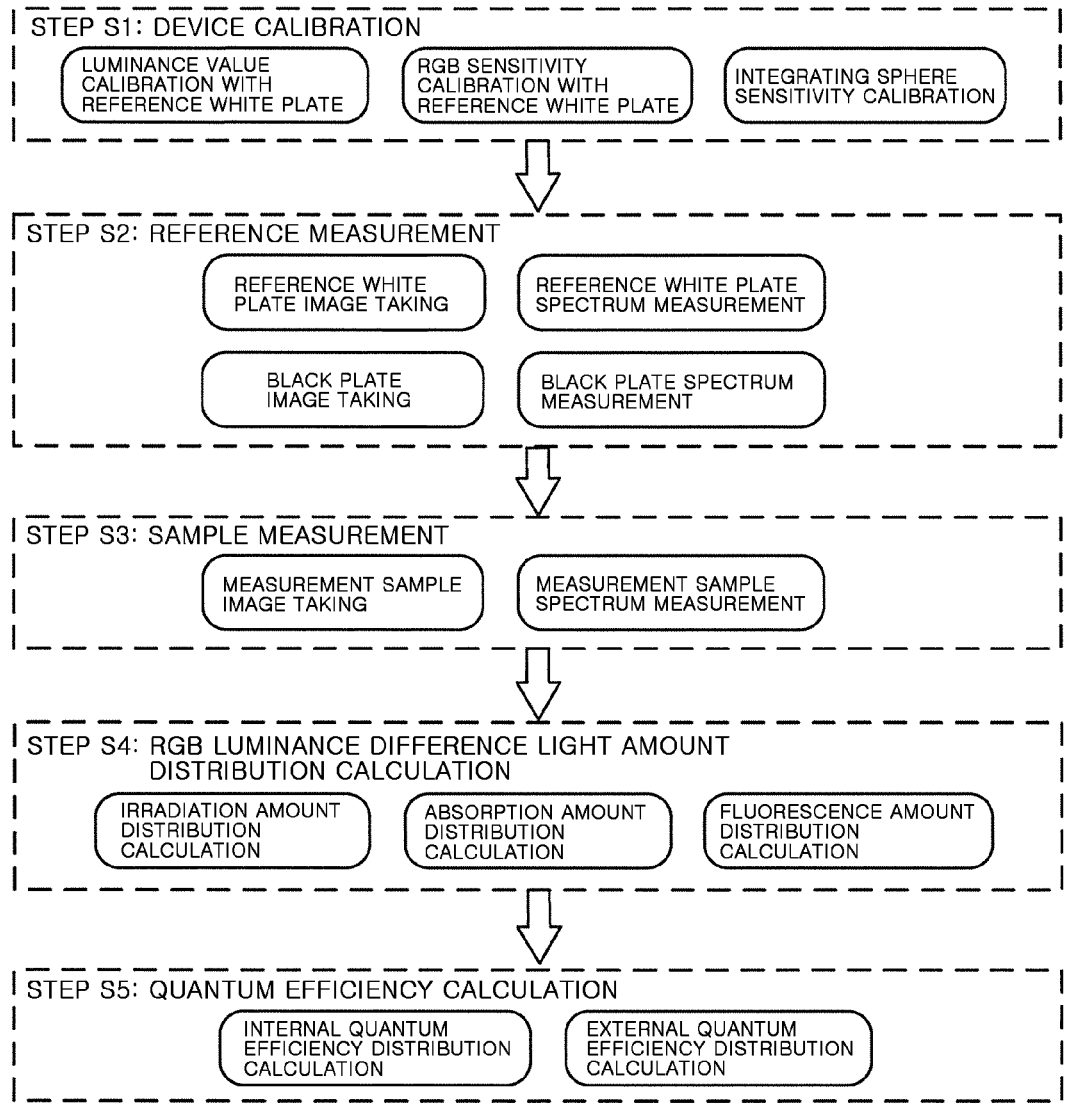
FIG. 4 is a flow chart of steps of executing a quantum efficiency calculation method in a first embodiment of the present invention.

FIG. 4 is an illustration of the flow of steps of executing the method according to the first embodiment. The operator first executes device calibration for calibrating the device (fluorescence spectrophotometer) (Step S1). The device calibration includes, at least, luminance value calibration with a reference white plate, RGB sensitivity calibration with a reference white plate, and integrating sphere sensitivity calibration.

Firstly, the luminance value calibration with a reference white plate, that is, calibration of the luminance value of the camera module 21 with the use of a reference white plate, is executed. When the bit depth of the camera module 21 is 8 bits, data of 256 gradations is obtained for a luminance value of 0 to 255. Although luminance value adjustment is executed in general photographing, device calibration suitable for this method is described below.

In general, photographing conditions are set, which avoid saturation of the luminance value of the camera module 21 with respect to the interior of an object to be photographed (here, a measurement sample), namely, saturation of the luminance value over 8 bits, which are the upper limit, in a taken image. However, obtainment of an absorption amount by which the measurement sample absorbs excitation light is required to calculate the quantum efficiency. The luminance value is therefore required to be calibrated based not on the measurement sample but on irradiation light with which the sample is irradiated. Accordingly, the luminance value of the camera module 21 is calibrated by using as a reference material a reference white plate that causes, when irradiated with excitation light used for measurement, a taken image to have a maximum luminance value.

First, a reference white plate W is placed in the sample holder 23 of the integrating sphere 20. The material used for the reference white plate W is, for example, a highly reflective material that has a reflection component coefficient of 90% or higher and that does not emit fluorescent light (for example, aluminum oxide, barium sulfate, or polytetrafluoroethylene (PTFE)). In order to avoid saturation, photographing using a highly reflective material is preferred as a basis for photographing conditions to be set.

A plurality of parameters including the length of exposure, the sensitivity (gain), and the aperture work as photographing conditions that affect the luminance value. When there are a plurality of parameters, adjustment can be made by using one of the parameters as a variable and fixing the rest of the parameters. For instance, the length of exposure is adjusted with the sensitivity (gain) and the aperture fixed, to set a value at which the luminance value does not saturate.

Light with which the reference white plate W is to be irradiated is calibrated in advance with monochromatic light separated as excitation light of the fluorescence spectrophotometer 1. The fluorescence spectrophotometer 1 is also capable of irradiation with white light (zero-order light), which is not separated, but photographing conditions are set in advance under an excitation wavelength condition of monochromatic light to be used because the quantum efficiency is normally obtained for each excitation wavelength. When white light (zero-order light), which is not separated, and separated monochromatic light are both used for measurement, the zero-order light and the monochromatic light significantly differ in the amount of light, and it is therefore recommended to use different values as luminance values at which photographing conditions are set.

The amount of monochromatic light radiated from the excitation side spectroscope 12 and beam splitter 13 of the fluorescence spectrophotometer 1 varies from wavelength to wavelength. The sensitivity of the camera module (photographing device) 21 varies as well because spectral sensitivity characteristics of an R color filter, a G color filter, and a B color filter vary depending on what device is used. In view of the variations in the amount of excitation light and in intensity obtained in the camera module 21, photographing conditions at the luminance value of the excitation light are obtained in advance for every excitation wavelength to be used.

In the case of consecutive measurement, however, the change of photographing conditions for each excitation wavelength in photographing with the camera module 21 causes a non-sensing time in a sensor of the camera, which may lead to a drop in throughput. When a device to be used has a fixed configuration, a maximum wavelength at the amount of excitation light and a maximum wavelength of the spectral sensitivity of the camera module 21 are unique to the device. With the device configuration that uses the integrating sphere 20, the reflectance of a white material on the inner surface of the integrating sphere 20 and the reflectance of a white material of the reference white plate W are also characteristics that affect the result. It is therefore recommended to calculate a maximum wavelength by multiplying a spectral distribution at the amount of excitation light and the sensitivity of the camera module 21 by reflectance curves of the white material on the inner surface of the integrating sphere and of the reference white plate, calibrate the photographing conditions at the calculated maximum wavelength, and use the calibrated conditions as a representative value.

Secondly, the RGB sensitivity calibration with a reference white plate, that is, calibration of the R sensitivity, G sensitivity, and B sensitivity of the camera module 21 with the use of a reference white plate, is executed. This calibration is executed because there are sensitivity differences among an R channel, G channel, and B channel of the camera module 21, and the sensitivity differences may cause the channels to have values that do not match in photographing under white light. This calibration corresponds to general white balance adjustment. A "channel" corresponds to a portion of a photographing element included in the camera module 21 that catches light in a particular wavelength range.

Here, the integrating sphere 20 with the reference white plate W placed therein is irradiated with white light (zero-order light), which is not separated, from the fluorescence spectrophotometer 1, coefficients for R, G, and B are obtained so that the R channel, G channel, and B channel have luminance values that are approximately the same value, and the sensitivity is corrected. For instance, the correction is executed by obtaining, in advance, sensitivity correction values that are adapted to the luminance of the R channel and the luminance of the B channel with the luminance of the G channel as a reference, and multiplying obtained pixel sensitivities of the R channel and the B channel by the sensitivity correction values.

Illumination in the correction differs from ideal white light illumination in which the distribution is even throughout the wavelengths, due to the wavelength distribution of the amount of zero-order light as well as the wavelength distribution of the reflectance of the white material on the inner surface of the integrating sphere 20 and the reflectance of the white material of the reference white plate W. In short, a distribution obtained by multiplying the wavelength distribution of the zero-order light and the reflectance distributions of the white material on the inner surface of the integrating sphere and of the reference white plate together can be regarded as the wavelength distribution of white light illumination with which an object is to be irradiated. To obtain this wavelength distribution, the reference white plate W is placed in the integrating sphere 20, and the excitation side spectroscope 12 is used to set zero-order light and irradiate with the zero-order light. A flux of light from the integrating sphere 20 is scanned in the fluorescent light side spectroscope 15 in a wavelength range in which the R channel, the G channel, and the B channel are detectable (for example, from 380 nm to 700 nm), and is detected by the detector 16, to thereby obtain the wavelength distribution of the amount of light.

The obtained distribution of the amount of light of white light illumination in the integrating sphere is used to divide spectral sensitivity curves reflecting the wavelength distributions of the R channel, the G channel, and the B channel. The effect of the light amount distribution due to illumination is thus corrected.

Thirdly, a correction coefficient for the integrating sphere sensitivity calibration, that is, calibration of the sensitivity of the integrating sphere, is obtained. A highly reflective material that has a reflectance of 90% or higher and that does not emit fluorescent light (for example, aluminum oxide, barium sulfate, or polytetrafluoroethylene (PTFE)) is applied to the inner wall of the integrating sphere 20. The integrating sphere 20 reflects and absorbs not only excitation light irradiating the integrating sphere 20 but also reflected light reflected by a measurement sample and fluorescent light emitted by the measurement sample. That is, light irradiating the measurement sample includes its own reflected light and fluorescent light, and observed light is similarly an amalgamation of various light beams. This effect brought by the integrating sphere is required to be corrected in order to measure an accurate reflectance.

An integrating sphere correction coefficient in a fluorescence spectrum of light from the fluorescent light side spectroscope 15 can be obtained by measuring the reflectance of the integrating sphere 20 including the reference white plate. This method of obtaining the correction coefficient is described in Horigome, J., Wakui, T. et al., Bunseki Kagaku (Japan Analyst), Volume 58, Issue 6, 2009, pp. 553-559, in which fluorescence spectra are measured in the fluorescent light side spectroscope 15 and the detector 16 with the integrating sphere 20 removed and with the integrating sphere 20 installed, and the correction coefficient is calculated by division. In another known method, a standard light source whose spectral sensitivity curve is known is introduced into the integrating sphere, a light emission spectrum is measured in the fluorescent light side spectroscope 15 and the detector 16, and the correction coefficient is calculated by dividing the light emission spectrum by the known spectral sensitivity curve.

In this configuration, interreflection caused by the inner wall of the integrating sphere hardly affects a fluorescence component, whereas a reflection component is readily affected by the interreflection. Despite a known fact that a high-order component resulting from interreflection significantly affects observed light, accurate calculation of the reflection component is indispensable for quantum efficiency calculation. An image taken with the camera module 21 therefore requires correction of the high-order component resulting from interreflection. In the first embodiment, the effect of interreflection brought by the integrating sphere 20 on an image taken with and obtained from the camera module 21 is corrected by a non-linear model expressed in Expression (3).

$$R(\lambda) = c_1 R'^{m_1}(\lambda) + c_2 R'^{m_2}(\lambda) + \cdots \quad (3)$$
$$= \sum_i c_i R'^{m_i}(\lambda)$$

In Expression (3), R and R' represent a spectral reflectance observed with the use of a true value and a spectral reflectance observed with the use of the integrating sphere 20, respectively, and $c_i$ and $m_i$ (i=1, 2, . . . ) represent a coefficient sequence and an exponent sequence, respectively, which are used in correction. In the first embodiment, any appropriate sequence is set as the exponent sequence $m_i$, and the coefficient sequence $c_i$ is calculated from measurement using a reference white plate, which is a reference material, and the integrating sphere. The coefficient sequence obtained here, namely, the correction coefficient $c_i$, is used to execute reflectance correction in Step S4.

The operator next executes reference measurement for measuring reference materials that include a reference white plate and a black plate to obtain data of the reference materials (Step S2). The reference measurement includes, at least, reference white plate image taking, reference white plate spectrum measurement, black plate image taking, and black plate spectrum measurement.

The operator first places the reference white plate W in the sample holder 23 of the integrating sphere 20. The reference white plate W is irradiated with excitation light in a suitable wavelength range and at suitable wavelength intervals in order to photograph an image of the reference white plate at each excitation wavelength with the camera module 21 and measure a fluorescence spectrum of the reference white plate. This image corresponds to the irradiation amount in each pixel, and an irradiation amount distribution at each excitation wavelength is accordingly obtained by calculation for each pixel. In this measurement, a fluorescence spectrum of a standard sample is measured. The obtained spectrum corresponds to an average spectrum of excitation light irradiating the surface of the sample.

The operator next places a black plate B in the sample holder 23 of the integrating sphere 20. The same conditions as those of the reference white plate W are used to photograph an image of the black plate B and measure a fluorescence spectrum of the black plate B. The black plate B is desired to be of a diffusely reflective material that has a reflectance of 0% to completely absorb light. The image and fluorescence spectrum of the black plate B correspond to backgrounds of respective measurement values. Measurement values of the black plate B are subtracted, as the backgrounds, from R, G, and B luminance values of each pixel in an image, and from a fluorescence intensity of a fluoresce spectrum. It can therefore be said that the black plate B is one of reference materials as the reference white plate is.

The operator next executes sample measurement for obtaining data of a sample that is an object to be measured (Step S3). The sample measurement includes, at least, measurement sample image taking and measurement sample spectrum measurement. The operator places the measurement sample S in the sample holder 23 of the integrating sphere 20. Under the same conditions as those for the measurement of the reference white plate W, a predetermined surface (generally a cut-out flat surface) of the sample S is irradiated with excitation light having an excitation wavelength in a suitable wavelength range at suitable wavelength intervals, and an image of the irradiated measurement sample S is taken. A fluorescence spectrum of the measurement sample S is subsequently measured under the same conditions as those for the measurement of the reference white plate.

Figure 5A:
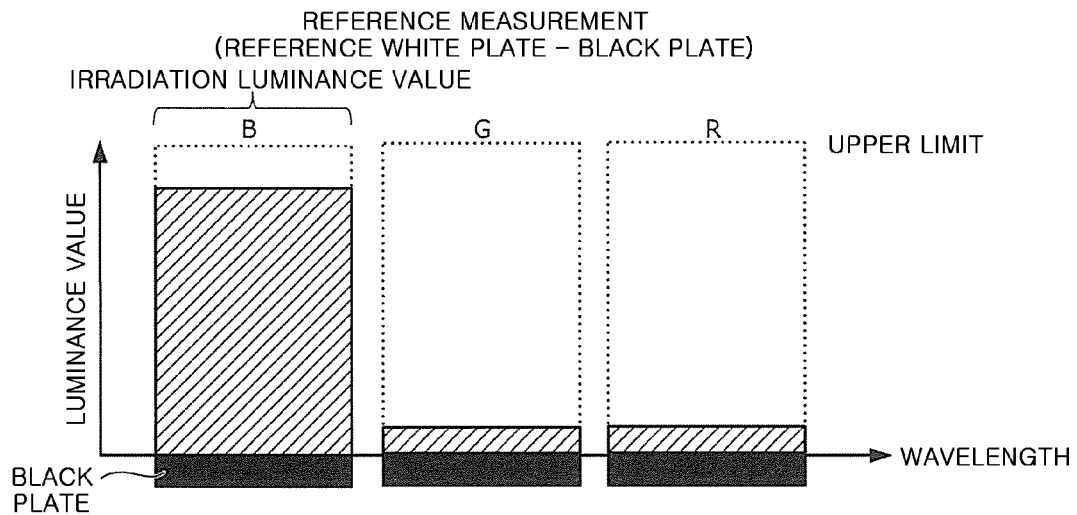
Figure 5B:
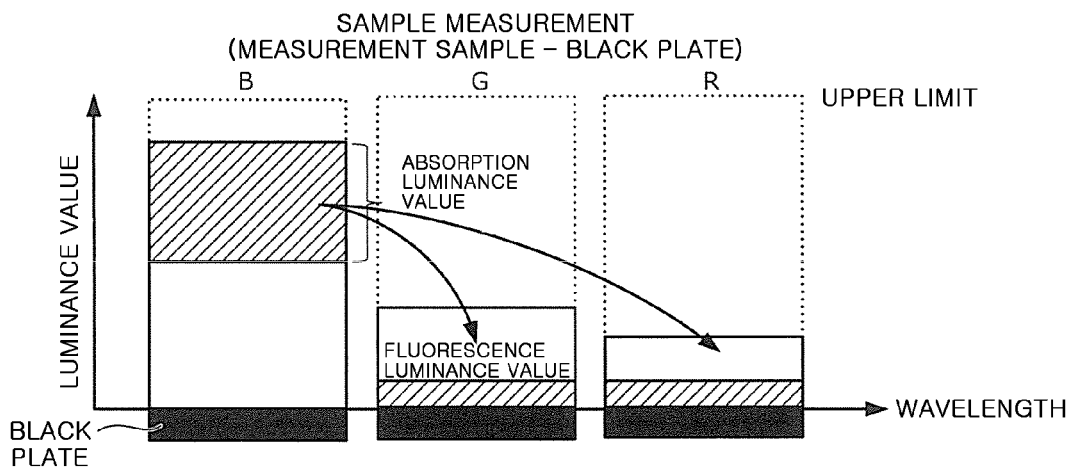
Figure 5C:
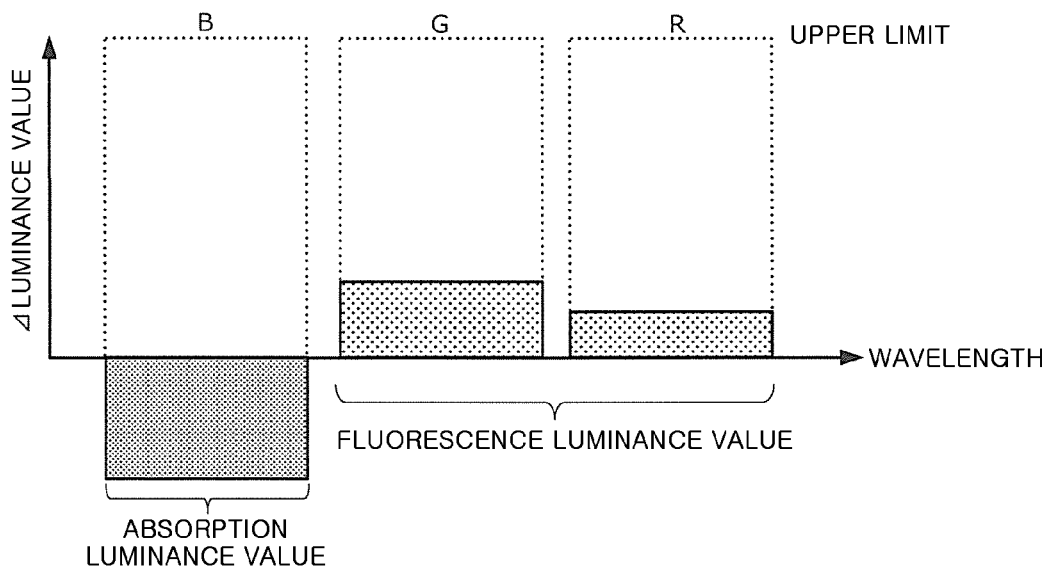

The measurement results described above serve as a basis for the next step in which the computer 31 executes light amount distribution calculation for calculating a distribution of the amount of light based on luminance differences among the R channel, the G channel, and the B channel (Step S4). The light amount distribution calculation includes, at least, irradiation amount distribution calculation, which is based on the image taken of the reference white plate W in Step S2, and absorption amount distribution calculation and fluorescence amount distribution calculation, which are based on an image taken of the measurement sample S in Step S3. FIG. 5A to FIG. 5C are conceptual graphs for showing relationships between an irradiation luminance value, an absorption luminance value, and a fluorescence luminance value in the R channel, G channel, and B channel of the camera module 21. An "upper limit" in FIG. 5A to FIG. 5C indicates an upper limit to the luminance value of the camera module 21 that has been calibrated with the reference white plate W in Step S1 and, when the reference white plate W is measured in Step S2, its luminance value does not exceed the upper limit value.

In this example, relationships between the irradiation luminance value, the absorption luminance value, and the fluorescence luminance value in the R channel, the G channel, and the B channel are described by taking 440 nm, which is a single excitation wavelength shown in FIG. 2, as an example. Generally speaking, a photographing element that can be included in the camera module 21, for example, a color CCD or a color CMOS, has a B channel corresponding to light in a wavelength range of from 400 nm to 500 nm, a G channel corresponding to light in a wavelength range of from 480 nm to 580 nm, and an R channel corresponding to light in a wavelength range of from 550 nm to 700 nm, and the cannels can each receive light in its corresponding wavelength range.

FIG. 5A shows the luminance values of the R channel, the G channel, and the B channel in the reference measurement in Step S2. In the reference measurement in Step S2, light is received by the B channel corresponding to a wavelength of 440 nm, and the irradiation luminance value is obtained. Luminance values are obtained in the G channel and the R channel as well, but the obtained luminance values are small values that are on the level of fluctuations caused by stray light of excitation light or by noise. In this step, the luminance value of the black plate B is subtracted from the obtained luminance values to calculate net luminance values.

FIG. 5B shows measured luminance values in the R channel, the G channel, and the B channel in the sample measurement in Step S3, namely, measurement luminance values. The measurement sample absorbs light having a wavelength of 440 nm, and light reflected by the measurement sample instead of being absorbed is observed. The reflected light is light reflected mainly by the B channel, which corresponds to a range of wavelengths including 440 nm. The luminance value of the B channel in this step is smaller than the luminance value of the reference white plate W in the reference measurement, because the absorption of the excitation light by the sample S decreases the amount of light.

Meanwhile, fluorescent light is emitted as a result of excitation, and forms a spectrum of FIG. 2 which peaks at the fluorescence wavelength of 520 nm. With the emission of the fluorescent light, luminance values are obtained in the G channel and the R channel in the camera module 21. The luminance values of the G channel and the R channel in this step are larger than the luminance value of the reference white plate W in the reference measurement, because the sample S emits fluorescent light.

This phenomenon is due to the fact that, following the principle of Stokes fluorescence, in which fluorescent light is generated as long-wavelength light lower in energy level than excitation light, fluorescent light caused as a result of excitation at 440 nm is emitted as light having a wavelength longer than 440 nm. In the channels of the camera module 21, fluorescent light is observed in the G channel and the R channel when the measurement sample S is excited in the range of the B channel. This means that, theoretically, the absorption luminance value in the B channel is distributed to the fluorescence luminance values of the G channel and the R channel. In addition, light to be incident as the excitation light is generated at the same wavelength as the wavelength of reflection, and luminance values of reflection and absorption are accordingly observed in a channel of the reference white plate w in which luminance values of reflection and absorption have been observed in the reference measurement. The absorption luminance value and the fluorescence luminance value are calculated by using those relationships.

Specifically, in the B channel to which the excitation wavelength "440 nm" of irradiating light belongs, a luminance value difference (change) obtained by subtracting the luminance value (irradiation luminance value) of the reference measurement from the luminance value (measurement luminance value) of the sample measurement as shown in FIG. 5C corresponds to the absorption luminance value. In the G channel and the R channel to which the excitation wavelength does not belong, a luminance value difference (change) obtained by subtracting the luminance value (irradiation luminance value) of the reference measurement from the luminance value (measurement luminance value) of the sample measurement corresponds to the fluorescence luminance value. An absorption luminance distribution and a fluorescence luminance distribution are obtained by calculating the absorption luminance value and the fluorescence luminance value for each pixel. The absorption luminance distribution and the fluorescence luminance distribution are calculated for each excitation wavelength used in the measurement, to thereby obtain an excitation wavelength-based absorption luminance distribution and an excitation wavelength-based fluorescence luminance distribution.

Next, the computer 31 calculates the internal quantum efficiency and the external quantum efficiency (Step S5). The wavelength ranges of the channels are taken into account and, when the excitation wavelength is from 400 nm to 500 nm, the luminance value of the B channel is used as the absorption luminance value and the luminance values of the G channel and the R channel are used as the fluorescence luminance value. The luminance values of the R channel, the G channel, and the B channel in this step are values that have been corrected by the luminance value calibration in Step S1, and can therefore be subjected to intercomparison. The sum of the luminance values of the G channel and the R channel corresponds to the fluorescence luminance value. When the excitation wavelength is from 480 nm to 580 nm, the luminance value of the G channel is used as the absorption luminance value and the luminance value of the R channel is used as the fluorescence luminance value.

The internal quantum efficiency can be obtained by dividing the fluorescence amount by the absorption amount based on Expression (1), and an internal quantum efficiency distribution can accordingly be obtained by dividing the calculated fluorescence amount distribution by the absorption amount distribution. In other words, the internal quantum efficiency of each pixel is calculated from the ratio between the fluorescence luminance value and the absorption luminance value, and an internal quantum efficiency part in a predetermined surface of the observed sample can be obtained by plotting the internal quantum efficiency of each pixel to corresponding coordinates on the predetermined surface.

An external quantum efficiency distribution can be obtained by dividing the calculated fluorescence amount distribution by the irradiation amount distribution obtained in Step S2, based on Expression (2). In other words, the external quantum efficiency of each pixel is calculated from the ratio between the fluorescence luminance value and the irradiation luminance value, and an external quantum efficiency distribution in a predetermined surface of the observed sample can be obtained by plotting the external quantum efficiency of each pixel to corresponding coordinates on the predetermined surface. This calculation is repeated for each excitation wavelength, to thereby obtain an excitation wavelength-based internal quantum efficiency distribution and an excitation wavelength-based external quantum efficiency distribution.

Images of the internal quantum efficiency distribution and the external quantum efficiency distribution can thus be obtained by calculating the irradiation amount distribution, the absorption amount distribution, and the fluorescence amount distribution, which can be calculated with the use of images of the luminance values in the R channel, G channel, and B channel of each pixel in the reference white plate and the measurement sample.

The camera module 21 in this example is assumed to be a general camera module, and a photographing element of the camera module has three channels, which are a first channel (the B channel), a second channel (the G channel), and a third channel (the R channel). Irradiation with excitation light belonging to the B channel, which corresponds to a range of the shortest wavelengths of all wavelength ranges, is used to calculate the absorption luminance value from a difference between the irradiation luminance value and measurement luminance value of the B channel, and calculate the fluorescence luminance value from the sum of a difference between the irradiation luminance value of the G channel and the measurement luminance value of the G channel and a difference between the irradiation luminance value of the R channel and the measurement luminance value of the R channel. It is needless to say that, as long as there are at least two channels, the absorption luminance value may be calculated from a difference between the irradiation luminance value and measurement luminance value of a first channel corresponding to a first wavelength range to which the wavelength of excitation light belongs, and the fluorescence luminance value may be calculated from a difference between the irradiation luminance value and measurement luminance value of a second channel. It is requisite here that the first wavelength range be generally smaller than a second wavelength range.

Figure 6A:
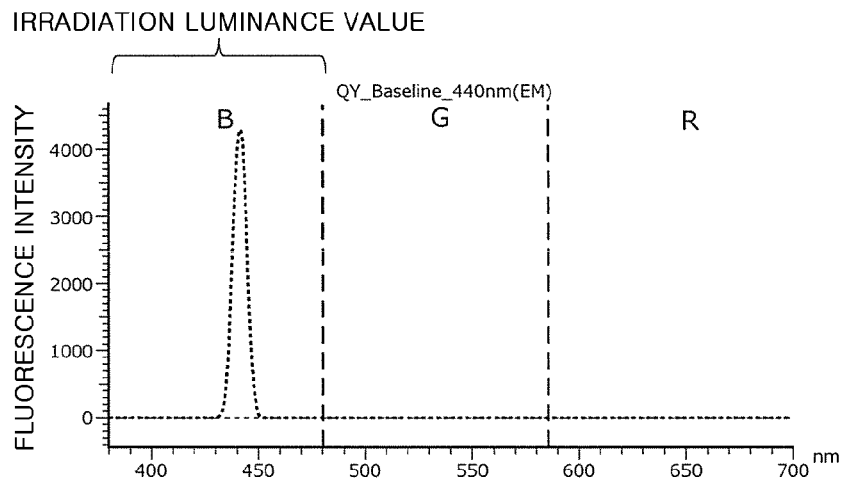
Figure 6B:
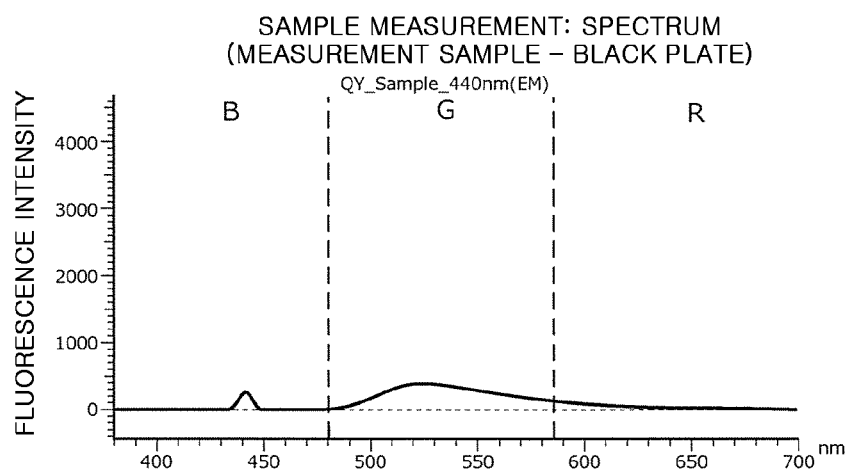
Figure 6C:
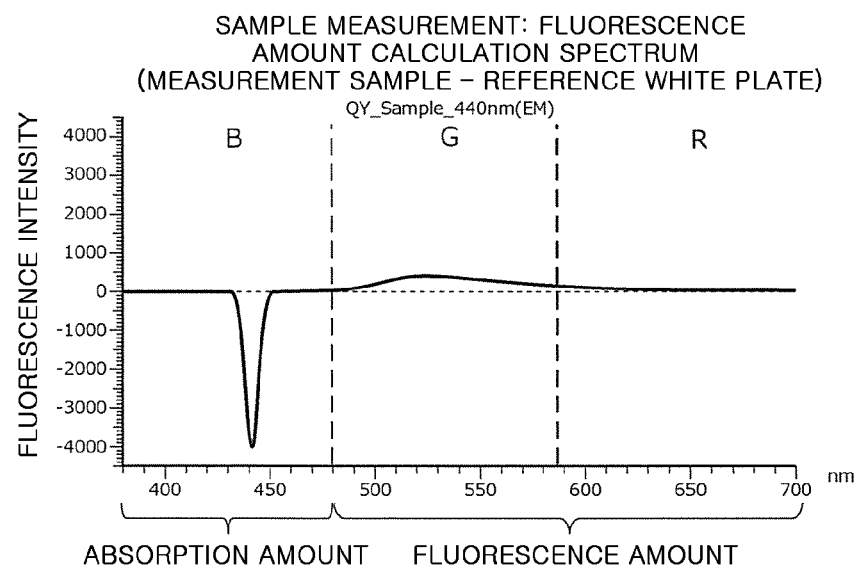

FIG. 6A to FIG. 6C show spectra obtained in the spectrum measurement in Step S2 and Step S3, and correspond to FIG. 5A to FIG. 5C, respectively. On the spectra, the absorption amount and the fluorescence amount appear in places corresponding to the absorption luminance value and the fluorescence luminance value.

Figure 7:
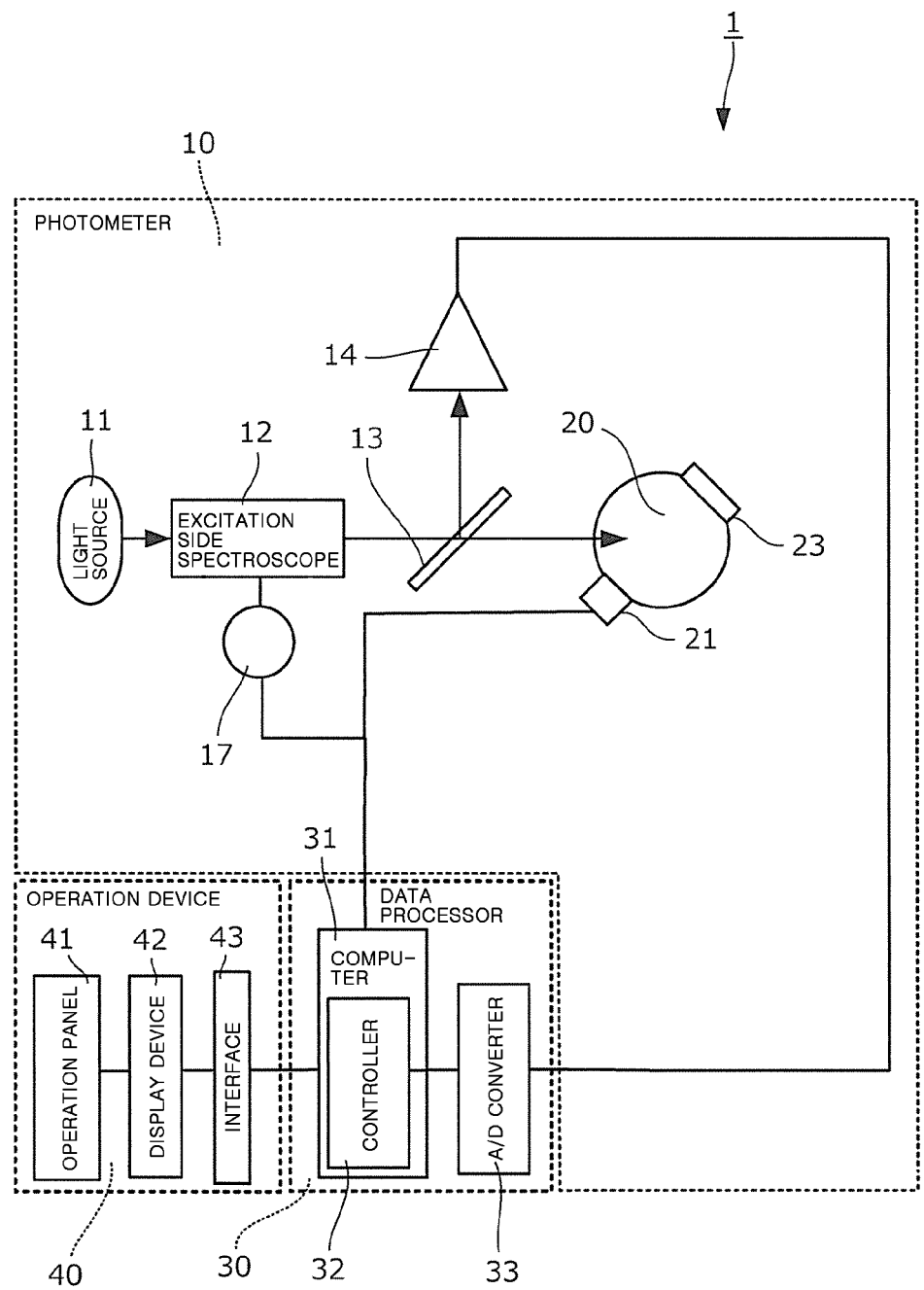
FIG. 7 is a block diagram for illustrating a configuration of a fluorescence spectrophotometer according to another embodiment of the present invention.
Figure 8A:
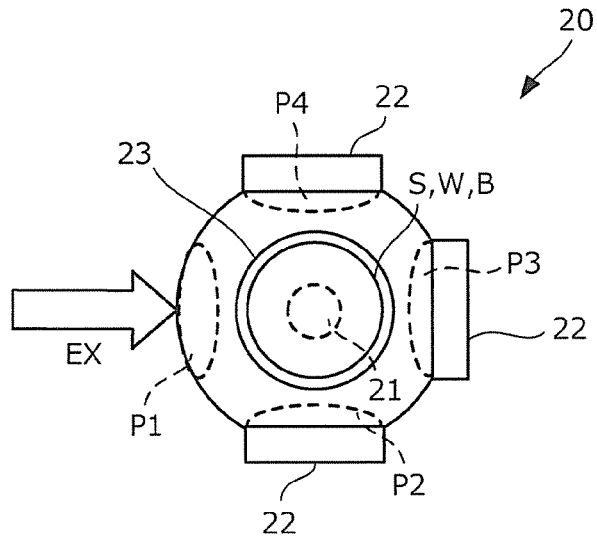
Figure 8B:
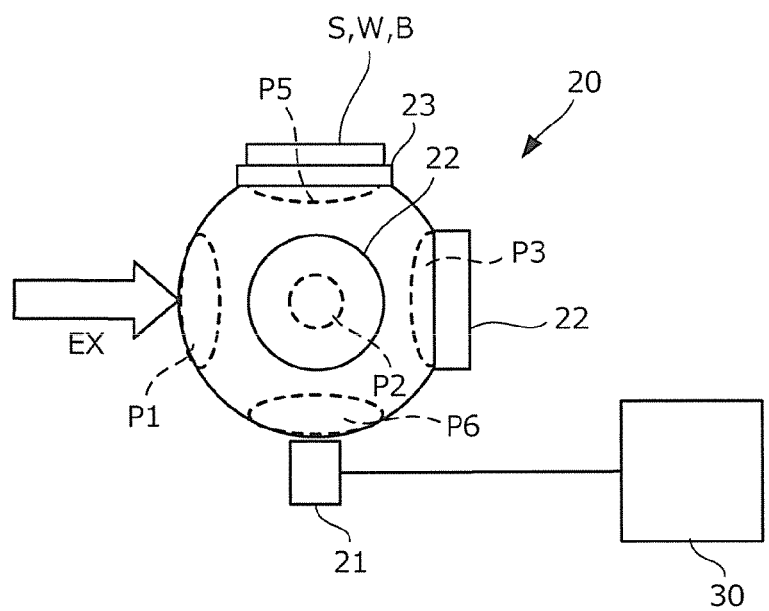

According to the first embodiment, an internal quantum efficiency distribution and an external quantum efficiency distribution can ultimately be obtained based on luminance values of the R channel, the G channel, and the B channel as described above, and spectrum measurement is not always required. However, as illustrated in FIG. 6A to FIG. 6C, measurement of a fluorescence spectrum at an excitation wavelength enables one to grasp which of the R channel, the G channel, and the B channel is assigned the absorption amount/absorption luminance value and the fluorescence amount/fluorescence luminance value, and is therefore useful. When measurement of a fluorescence spectrum is not required, the fluorescent light side spectroscope 15, the detector 16, and the fluorescent light side pulse motor 18 can be omitted as in another embodiment illustrated in FIG. 7 and FIG. 8A and FIG. 8B without compromising the carrying out of the present invention.

Figure 9:
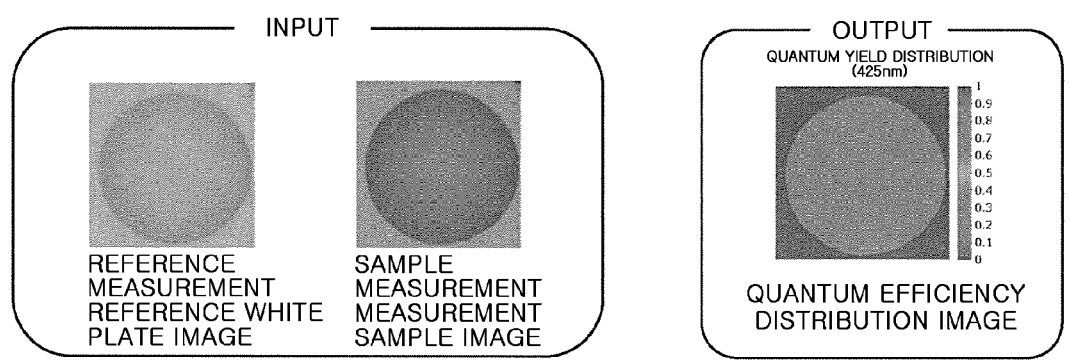
FIG. 9 is a diagram for illustrating an example of an image of the reference white plate and a sample image, which are input, and an image of a quantum efficiency distribution, which is output.

FIG. 9 shows an example of an image of the reference white plate, a measurement sample image of the sample, and an image that is the result of calculating the quantum efficiency in-plane distribution. When the image of the reference white plate obtained in Step S2 and the image of the measurement sample obtained in Step S3 are input, an image of the quantum efficiency distribution calculated in Step S5 through Step S4 is obtained as output. The display device 42 displays the input images and the output image, and thus enables the operator to analyze the properties of the sample in detail by observing the images. Quantum efficiency is a proportion and takes a value of from 0 to 1 because the amount (photon count) of absorbed light is not exceeded by the amount of generated fluorescent light. Each pixel has a value of from 0 to 1, and an image of a quantum efficiency distribution is accordingly recommended to be drawn as a heat map or other gradation images. Although the distribution image illustrated in FIG. 9 is of the internal quantum efficiency, a configuration in which the displayed distribution image is switched to a distribution image of the external quantum efficiency may be employed (see FIG. 19).

A method of obtaining a quantum efficiency distribution according to a second embodiment of the present invention is described next. In the first embodiment, images of luminance values in the R channel, G channel, and B channel of each pixel in a reference white plate and a measurement sample are used to calculate the absorption luminance value and the fluorescence luminance value by subtraction, and images of an internal quantum efficiency distribution and an external quantum efficiency distribution are obtained from the calculated luminance values. With this method, there may be a wavelength range in which detection wavelengths of the R channel, the G channel, and the B channel overlap (for example, the B channel is from 400 nm to 500 nm, the G channel is from 480 nm to 580 nm, and the R channel is from 550 nm to 700 nm). Consequently, when used excitation light has an excitation wavelength in overlapping wavelength ranges, the absorption amount is assigned across two channels, which may cause an error in the calculation of the absorption amount. Similarly, when fluorescent light is generated in a wavelength range in which the detection wavelengths of the R channel, the G channel, and the B channel overlap, an error may be caused in the calculation of the fluorescence amount.

Figure 10:
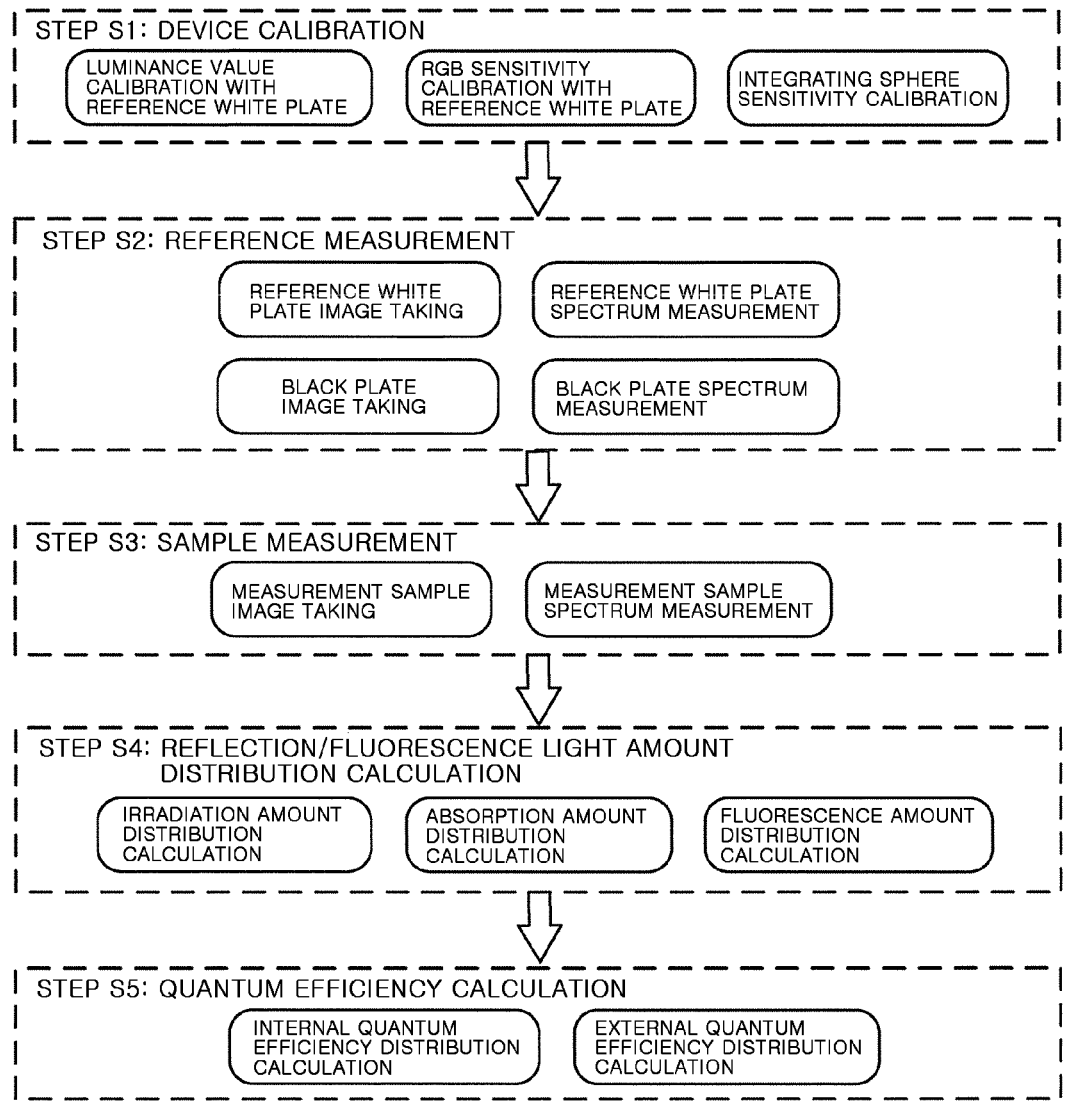
FIG. 10 is a flow chart of steps of executing a quantum efficiency calculation method in a second embodiment of the present invention.

In view of the issue described above, in the second embodiment, a fluorescence spectrum obtained with the fluorescent light side spectroscope 15 is used to calculate an absorption amount distribution and a fluorescence amount distribution from the R luminance value, G luminance value, and B luminance value of each pixel of a sample image. The device illustrated in FIG. 1 and FIG. 3A and FIG. 3B is usable in the second embodiment as well. FIG. 10 is an illustration of the flow of steps of executing the method according to the second embodiment. Step S1 to Step S3 in the second embodiment are the same as Step S1 to Step S3 in the first embodiment.

In Step S4, the fluorescence spectrum obtained with the fluorescent light side spectroscope 15 is used to calculate the absorption amount distribution and the fluorescence amount distribution from the R luminance value, G luminance value, and B luminance value of each pixel of the sample image. In the sample image, each of the R channel, G channel, and B channel of each pixel includes both of a reflected light component and a fluorescence component from the sample S. Light I (an intensity I of light) to be observed from a specific point on the measurement object is observable by taking the measurement sample image in Step S3, but can be expressed as the sum of the reflected light and the fluorescent light as in Expression (4). Expression (4) corresponds to Expression (7) to Expression (9) of Non-patent Literature.

$$I = I_R(\lambda) + I_F(\lambda)$$

$$I_R = R(\lambda)L(\lambda)$$

$$I_F = aF(\lambda) \quad (4)$$

In Expression (4), L represents an intensity spectrum of illumination irradiating that point, R represents a reflection spectrum of the sample at that point, "a" represents the absorption amount of the sample at that point, and serves as a fluorescence component coefficient, which determines the fluorescence intensity, and F represents a fluorescence spectrum of the sample. The intensity spectrum L and the fluorescence spectrum F can directly be obtained by measurement in Step S2 and Step S3, respectively. Though not noted in the expression, a net luminance value obtained by subtracting the luminance value of the black plate B, which corresponds to the background, is used. When this concept is applied to an R/G/B image (a color image), an R observation value $I^r$, G observation value $I^g$, and B observation value $I^b$ of one pixel are observable by taking the measurement sample image in Step S3 and are also calculable by performing integration with respect to the wavelength, with the spectral sensitivity of each channel as a coefficient, as in Expression (5) below. In Expression (5), $C^r$ $C^g$, and $C^b$ represent spectral sensitivities of the R channel, G channel, and B channel, respectively, of a photographing element included in the camera module 21, and are known values.

$$I^r = \int I(\lambda)C^r(\lambda)d\lambda \quad (5)$$
$$= \int R(\lambda)L(\lambda)C^r(\lambda)d\lambda + a \int F(\lambda)C^r(\lambda)d\lambda$$
$$I^g = \int R(\lambda)L(\lambda)C^g(\lambda)d\lambda + a \int F(\lambda)C^g(\lambda)d\lambda$$
$$I^b = \int R(\lambda)L(\lambda)C^b(\lambda)d\lambda + a \int F(\lambda)C^b(\lambda)d\lambda$$

In order to solve this model, one of the sample's reflection spectrum R and fluorescence characteristics (the excitation light spectrum indicating the absorbance and the fluorescence spectrum indicating the spectral distribution of the emitted light) "a" is required to be known, and a problem that RGB images are inadequate to record detailed wavelength information is another issue to be solved.

This estimation method is an attempt to solve those issues by treating excitation light that is monochromatic light of the fluorescence spectrophotometer as the illumination L (the intensity spectrum L of the illumination). In the fluorescence spectrophotometer 1, a measurement object is irradiated with light of a single wavelength as excitation light, and wavelength information of light emitted at the time is measured. The excitation wavelength is varied and the wavelength information is recorded for each excitation wavelength, to thereby exhaustively measure fluorescence characteristics of the measurement object. A reflection/fluorescence model under k-th single-wavelength illumination $L_k$, which is expressed by $L(\lambda_k)$, can be obtained by Expression (6) below.

$$I_k^r = R_k(L_k C_k^r) + a'_k F^r$$
$$I_k^g = R_k(L_k C_k^g) + a'_k F^g$$
$$I_k^b = R_k(L_k C_k^b) + a'_k F^b \quad (6)$$

In Expression (6), the subscript "k" represents a value at the k-th wavelength (example: $R_k = R(\lambda_k)$). Because of single-wavelength illumination, $L_k$ has no intensity at wavelengths other than $\lambda_k$, and it should be noted that integration thereof is given by a single-term expression as in, for example, Expression (7) below.

$$\int R(\lambda)L_k C^g(\lambda)d\lambda = R(\lambda_k)L_k C^g(\lambda_k) = R_k L_k C_k^g \quad (7)$$

Figure 11:
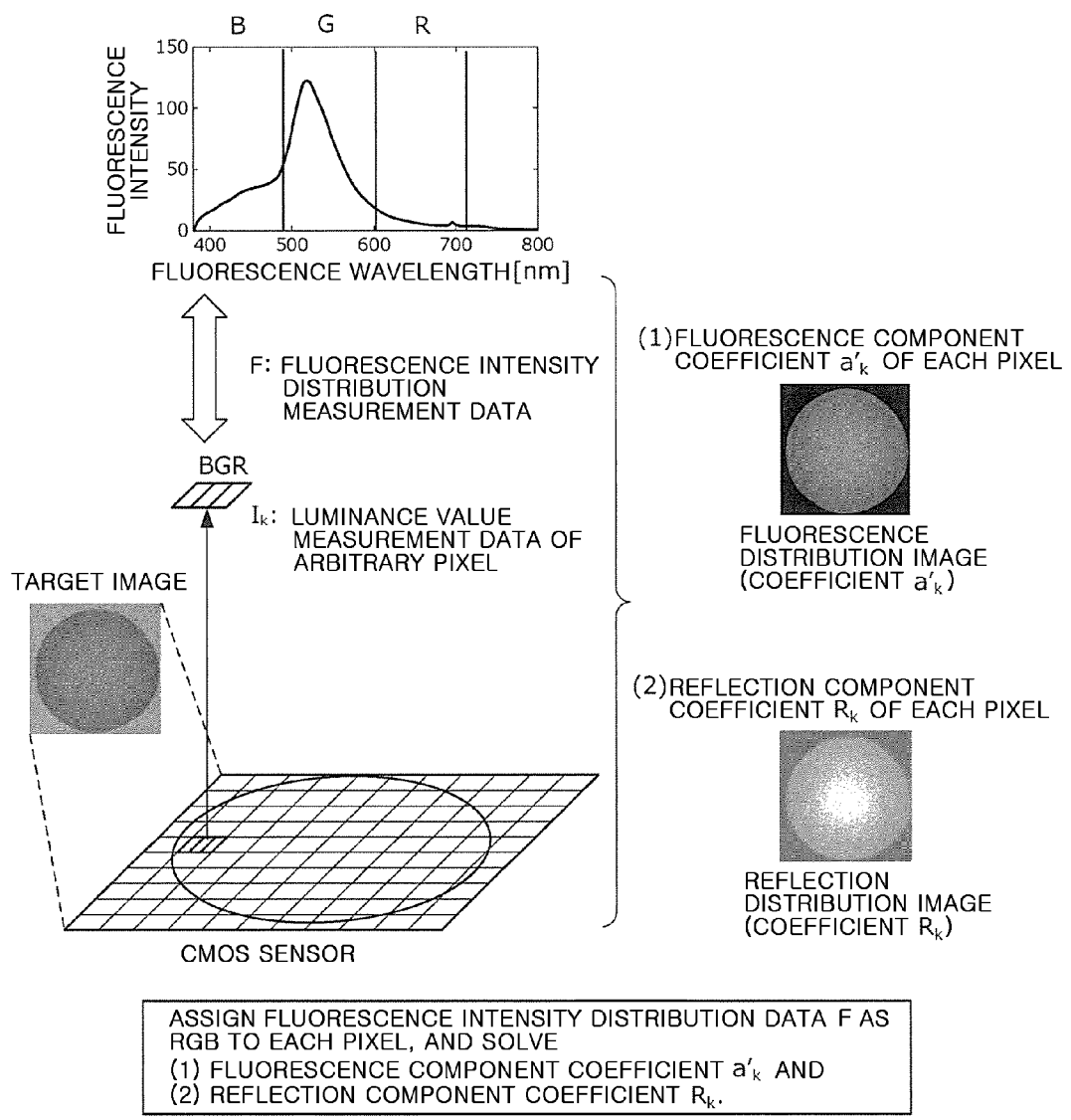
FIG. 11 is a conceptual diagram for illustrating the process of calculating a reflection component coefficient and a fluorescence component coefficient.

FIG. 11 is a conceptual diagram for illustrating the process of calculating a reflection component coefficient (reflectance) $R_k$ and a fluorescence component coefficient $a'_k$. As described above, $(L_k C_k)$ in Expression (6) can be measured by the photographing with the use of the reference white plate W in Step S2, and F is measurable by the measurement with the use of the fluorescence spectrophotometer 1 in Step S3 and calculable as a known value from the spectral sensitivity of the camera module 21. The fluorescence spectrum F is affected by the reflectance of the integrating sphere 20. A fluorescence spectrum obtained from the fluorescence spectrophotometer 1 is therefore corrected with the use of the correction coefficient of the integrating sphere 20 obtained in the third process in Step S1. The correction coefficient of the integrating sphere 20 is applied as a value for each of wavelengths varied in units of several nm, as is the case for the fluorescence spectrum.

The fluorescence spectrum F is obtained at a predetermined point (pixel) as drawn in, for example, the topmost part of FIG. 11. However, the shape of the fluorescence spectrum is not changed by a change in the absolute value of the fluorescence intensity as long as the material of the surface to be measured (sample surface) does not change. That is, with the fluorescence spectrum F obtained, the distribution of the fluorescence intensity to the wavelength ranges of R, G, and B is determined in a manner that is uniform to any point, and the distribution to $F^r$, $F^g$, and $F^b$ is therefore automatically determined in every pixel in the surface as well. In short, this distribution is obtained in the form of fluorescence intensity distribution data.

Figure 12:
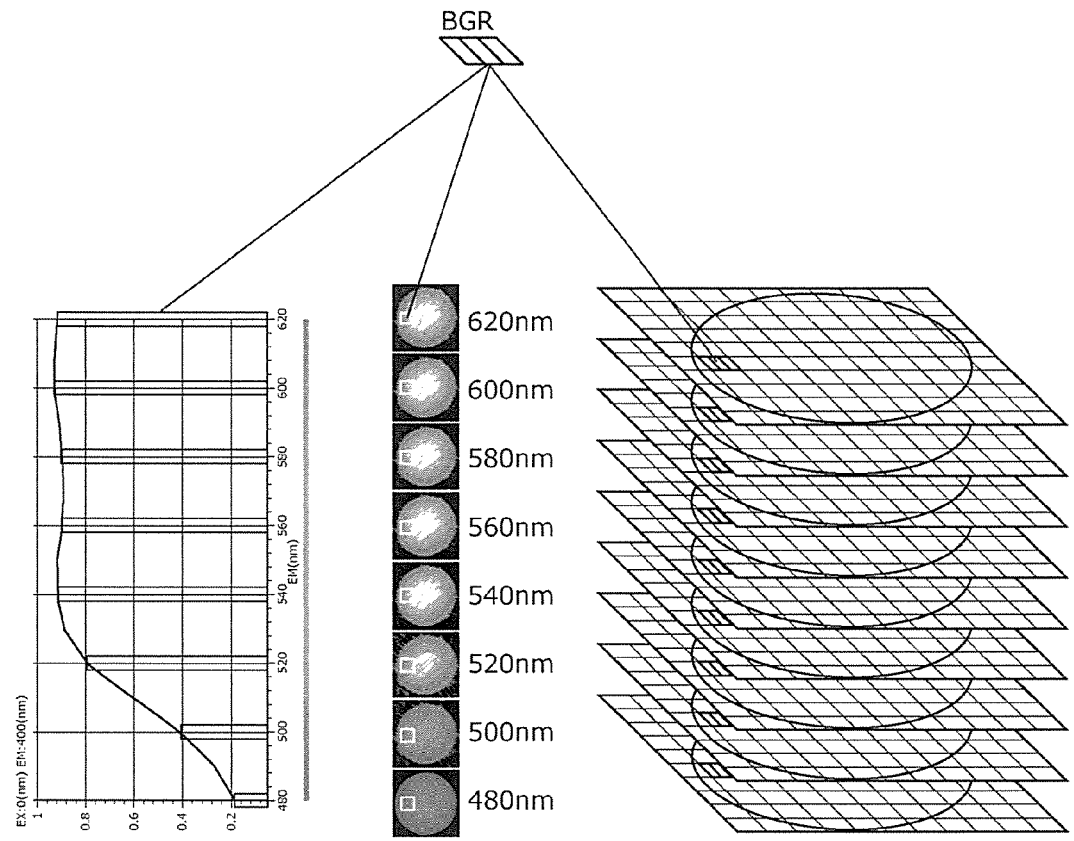
FIG. 12 is a conceptual diagram for illustrating the process of forming a fluorescence spectrum.

This leaves the reflection component coefficient $R_k$ and the fluorescence component coefficient $a'_k$ at the wavelength $\lambda_k$ as the only unknown quantities in Expression (6), and the unknown values can be obtained by solving this system of equations. This calculation is performed for every excitation wavelength (the wavelengths $\lambda_{k1}$, $\lambda_{k2}$, ..., $\lambda_k$), to thereby obtain a reflection spectrum and an excitation light spectrum as illustrated in FIG. 12. That is, the amount of reflected light of each pixel is calculable based on the reflection component coefficient and the irradiation luminance value, and the fluorescence amount of each pixel is also calculable based on the fluorescence component coefficient and the fluorescence intensity distribution data. A reflected light amount distribution $I_R$ and a fluorescence amount distribution $I_F$ can further be obtained by calculating the amount of reflected light and the fluorescence amount for every pixel.

Measurement using the fluorescence spectrophotometer 1 yields an average fluorescence spectrum of fluorescence from the measurement sample S. When the measurement sample S has a mixture of a plurality of fluorescence components, the fluorescence spectrum of this sample is the sum of fluorescence spectra. The spectrum that is the sum is processed by PARAFAC or a similar method to separate the fluorescence spectrum for each component, and F is defined as a component-based fluorescence spectrum to obtain the fluorescence amount distribution $I_F$ and the reflected light amount distribution $I_R$ in each component.

The obtained distribution $I_R$ is then corrected by applying the coefficient obtained in Step S1 to Expression (3).

The absorption amount in each pixel is calculated from a difference between the irradiation amount (the distribution of the amount of light radiated from the light source) that corresponds to the irradiation luminance value obtained in Step S2 for each of the R channel, the G channel, and the B channel in the camera module 21, and the amount of reflected light in each pixel. That is, an absorption amount distribution $I_A$ is obtained from a difference between the irradiation amount distribution L that corresponds to the irradiation luminance value obtained in Step S2 and the reflected light amount distribution $I_R$ obtained in Step S3 by the calculation described above.

Specifically, in the process described above, the irradiation luminance value is obtained from an image of the reference white plate taken with the camera module 21, and the measurement luminance value of each pixel on the predetermined surface of the sample is obtained as well. The fluorescence spectrum F is further obtained with the detector (fluorescence detector). This fluorescence spectrum is a similar figure in every place on the predetermined surface, and the fluorescence intensity distribution data $F^b$, the fluorescence intensity distribution data $F^g$, and the fluorescence intensity distribution data $F^r$, which respectively correspond to fluorescence wavelength ranges of three channels that are the first channel (B channel), the second channel (G channel), and the third channel (R channel), are calculated with respect to F for every pixel (every point). The irradiation luminance value, the measurement luminance value, and the fluorescence intensity distribution data in each pixel are obtained for each wavelength, and, based on the wavelength-based irradiation luminance value, measurement luminance value, and fluorescence intensity distribution data of one pixel, the reflection component coefficient R and the fluorescence component coefficient a' in the pixel can be calculated by Expression (6).

The amount of reflected light of each pixel can further be calculated based on the reflection component coefficient R and the fluorescence component coefficient a', and the fluorescence amount of each pixel can also be calculated based on the fluorescence component coefficient a and the fluorescence intensity distribution data. The absorption amount of each pixel can be calculated as well, based on a difference between the irradiation amount and the amount of reflected light. The quantum efficiency of each pixel is calculable from those values, and a quantum efficiency distribution in the predetermined surface of the sample can thus be obtained.

In Step S5, the internal quantum efficiency of the measurement sample S is calculated by Expression (8) below, which is derived from Expression (1). That is, the internal quantum efficiency of each pixel is calculated from the ratio between the fluorescence amount and the absorption amount.

$$IQE = \frac{\int I_F(\lambda) d\lambda}{\int L(\lambda) - I_R(\lambda) d\lambda} \quad (8)$$

Similarly, the external quantum efficiency of the measurement sample S is calculated by Expression (9) below, which is derived from Expression (2). That is, the external quantum efficiency of each pixel is calculated from the ratio between the fluorescence amount and the irradiation amount.

$$EQE = \frac{\int I_F(\lambda) d\lambda}{\int L(\lambda) d\lambda} \quad (9)$$

In those calculations, when the amount of light at a single excitation wavelength is approximated with the sum of luminance values of the R channel, the G channel, and the B channel, Expression (10) and Expression (11) below are obtained as approximate expressions for the quantum efficiency at the k-th wavelength.

$$IQE_k \cong \frac{\alpha'_k(F^r + F^g + F^b)}{L_k(C_k^r + C_k^g + C_k^b)(1 - R_k)} \quad (10)$$

$$EQE_k \cong \frac{\alpha'_k(F^r + F^g + F^b)}{L_k(C_k^r + C_k^g + C_k^b)} \quad (11)$$

The denominator of Expression (10) indicates the product of the incidence amount and the absorption rate, namely, the absorption amount, and the numerator of Expression (10) indicates the fluorescence amount. As is understood from that, Expression (10) matches Expression (1). As is also understood from that, Expression (11) matches Expression (2), which proves that the quantum efficiency can be calculated by Expression (11).

Figure 13:
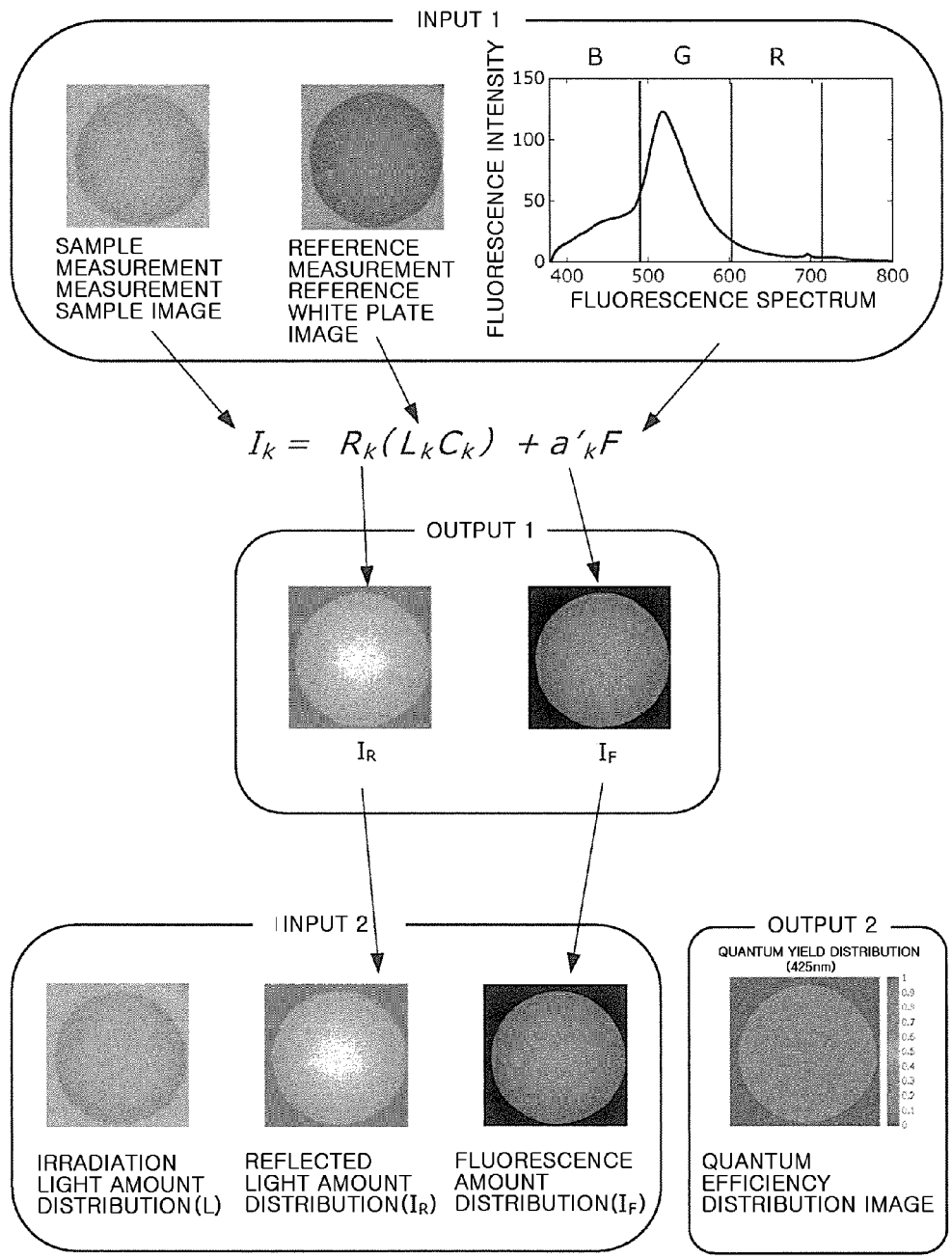
FIG. 13 is a diagram for illustrating an example of an image of the reference white plate, a sample image, and a fluorescence spectrum, which are input, and an image of a quantum efficiency distribution, which is output.

FIG. 13 is a conceptual diagram for illustrating the process described above. Input 1 includes the image obtained in Step S2 as an image of the luminance values in the R channel, G channel, and B channel of each pixel in the reference white plate W, the fluorescence spectrum obtained in Step S2, the image obtained in Step S3 as an image of the luminance values in the R channel, G channel, and B channel of each pixel in the measurement sample S, and the fluorescence spectrum obtained in Step S3. From Input 1, the reflection component coefficient $R_k$ and the fluorescence component coefficient $a'_k$ are calculated in Step S4 to obtain the reflected light amount distribution $I_R$ and the fluorescence amount distribution $I_F$. The absorption amount distribution $I_A$, which is obtained from a difference between the irradiation amount distribution L and the reflected light amount distribution $I_R$, is further calculated. With those as Input 2, the internal quantum efficiency distribution and the external quantum efficiency distribution, which are output, can be calculated in Step S5. As in the first embodiment, quantum efficiency is a proportion and takes a value of from 0 to 1 because the amount (photon count) of absorbed light is not exceeded by the amount of generated fluorescent light. Each pixel has a value of from 0 to 1, and an image of a quantum efficiency distribution is accordingly recommended to be drawn as a heat map or other gradation images.

Figure 14:
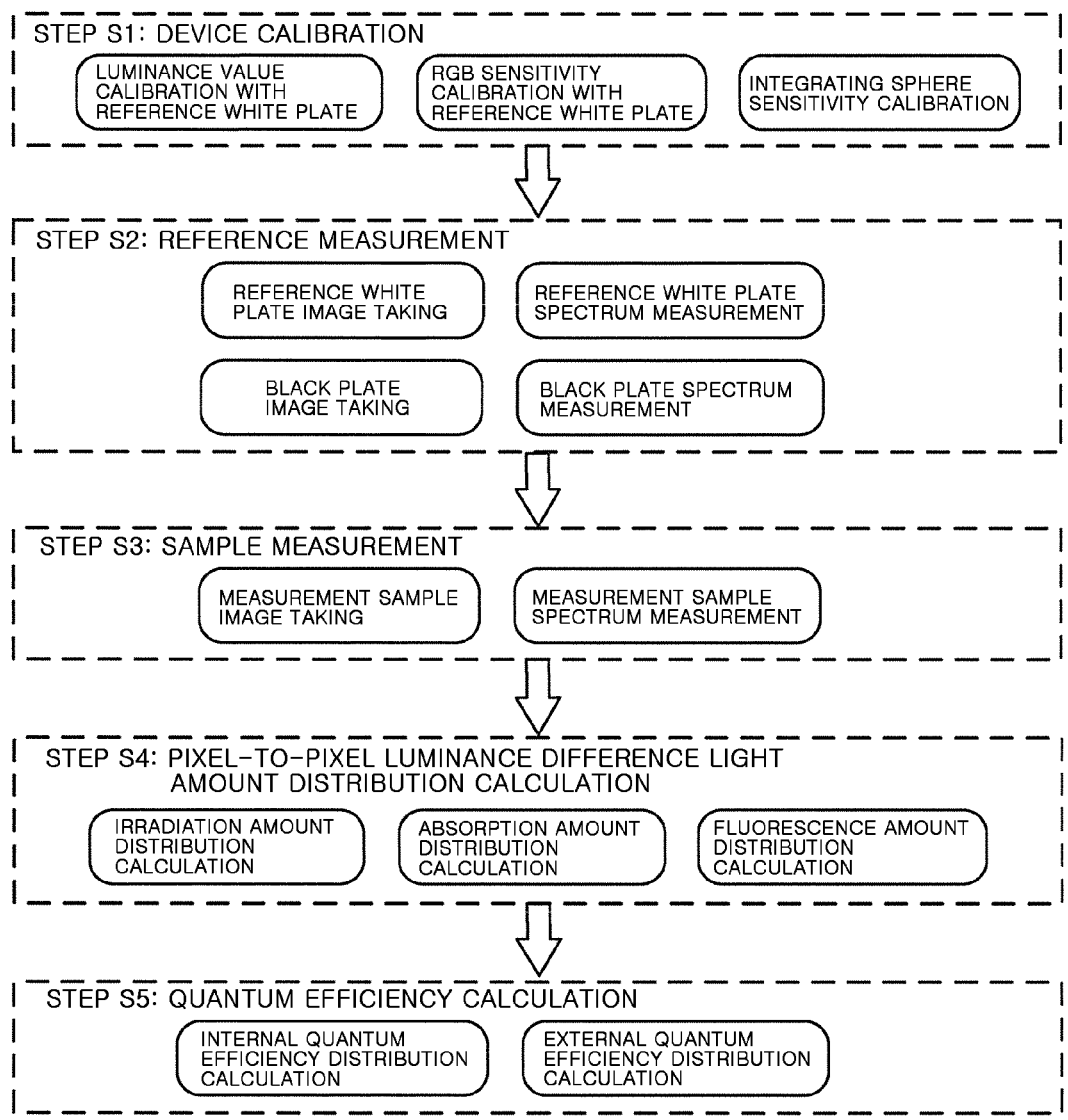
FIG. 14 is a flow chart of steps of executing a quantum efficiency calculation method in a third embodiment of the present invention.
Figure 15A:
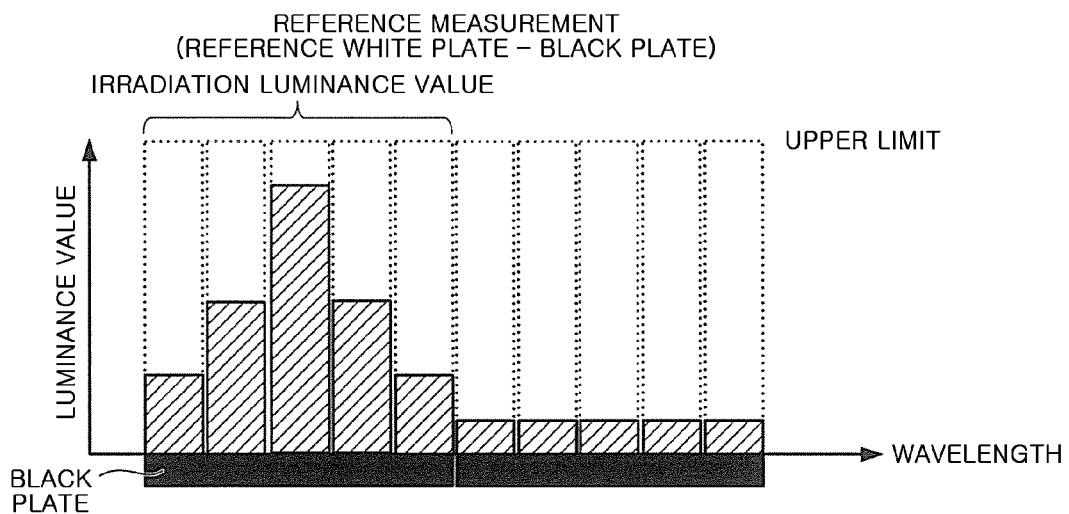
Figure 15B:
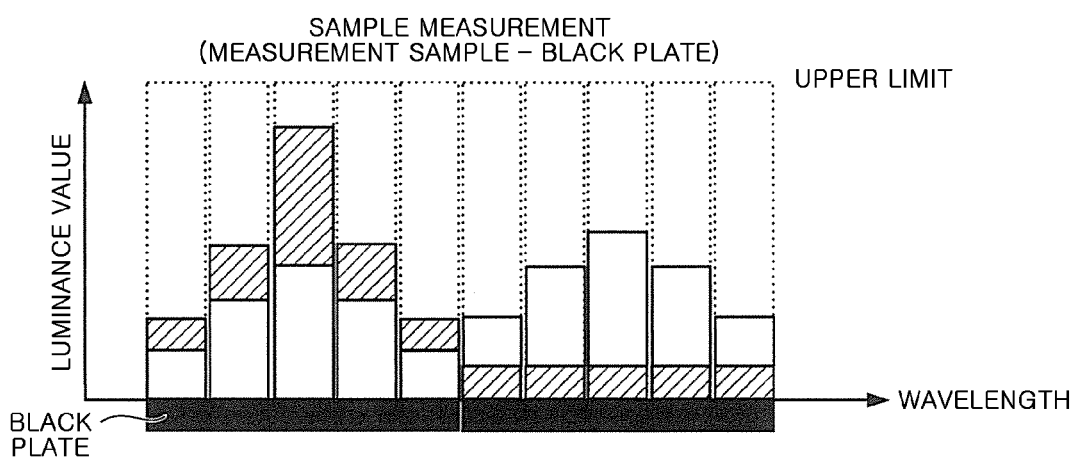
Figure 15C:
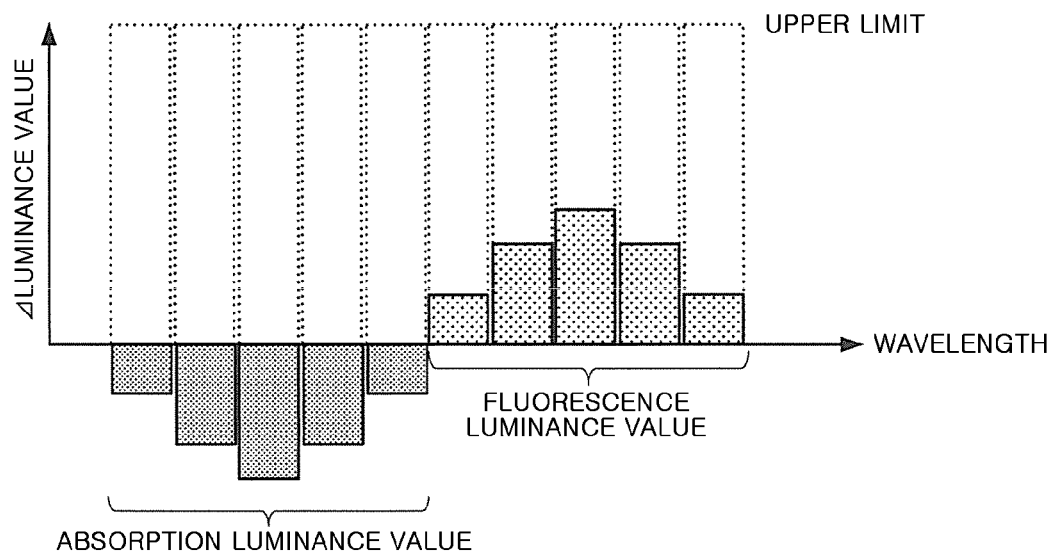

FIG. 14 and FIG. 15A to FIG. 15C show a method according to a third embodiment of the present invention. In the first embodiment, a quantum efficiency distribution is obtained with the camera module 21 in which the photographing element includes the R channel, the G channel, and the B channel. In the third embodiment, a multi-channel camera (spectral camera) is used, in which a photographing element includes a plurality of channels, instead of a three-channel color camera having an R channel, a G channel, and a B channel. FIG. 14 is an illustration of calculation steps to be executed when such a multi-channel camera is used in the camera module 21 of FIG. 1. In this case, data high in resolution in a wavelength direction because of many channels can be obtained as illustrated in FIG. 15A to FIG. 15C. With the three channels for R, G, and B, the possibility of an error in the calculation of the fluorescence amount is an issue when fluorescent light is generated in a wavelength range in which detection wavelengths of some of the channels overlap. Errors can be reduced by employing a multi-channel camera in the method according to the first embodiment as in the third embodiment.

Figure 16:
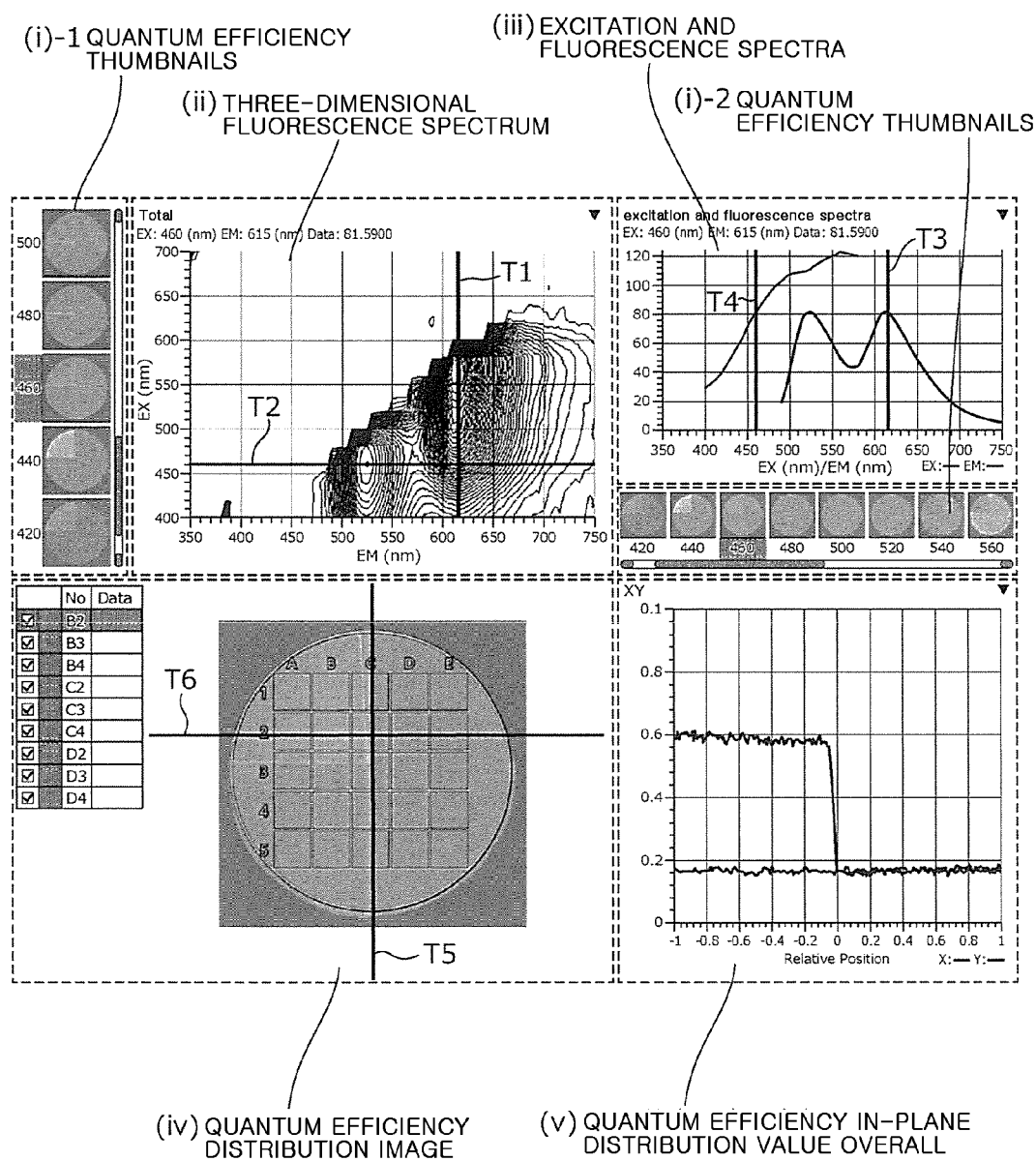
FIG. 16 is a diagram of a measurement result image to be displayed on a display device.
Figure 17:
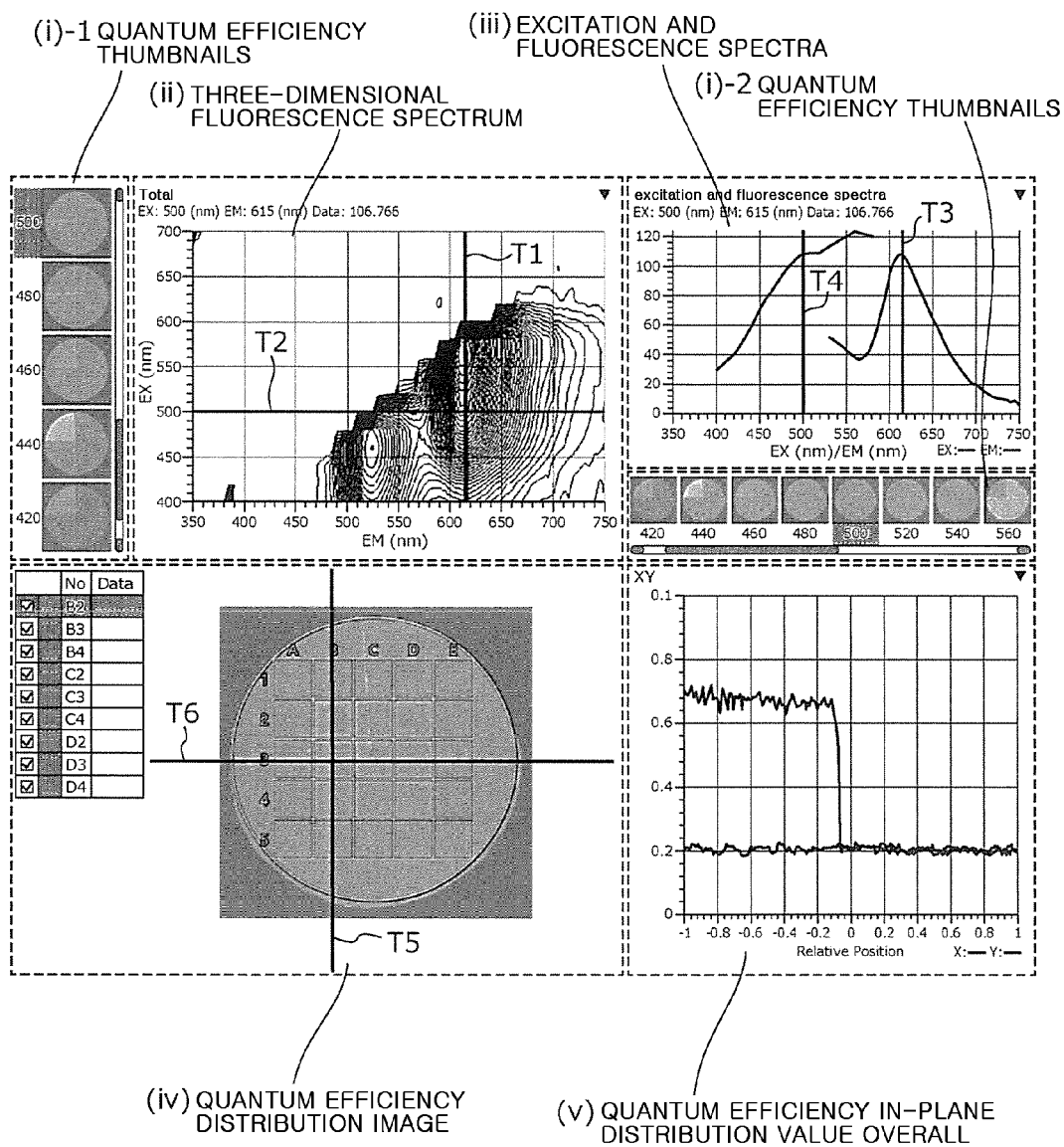
FIG. 17 is a diagram of a measurement result image to be displayed on the display device.
Figure 18:
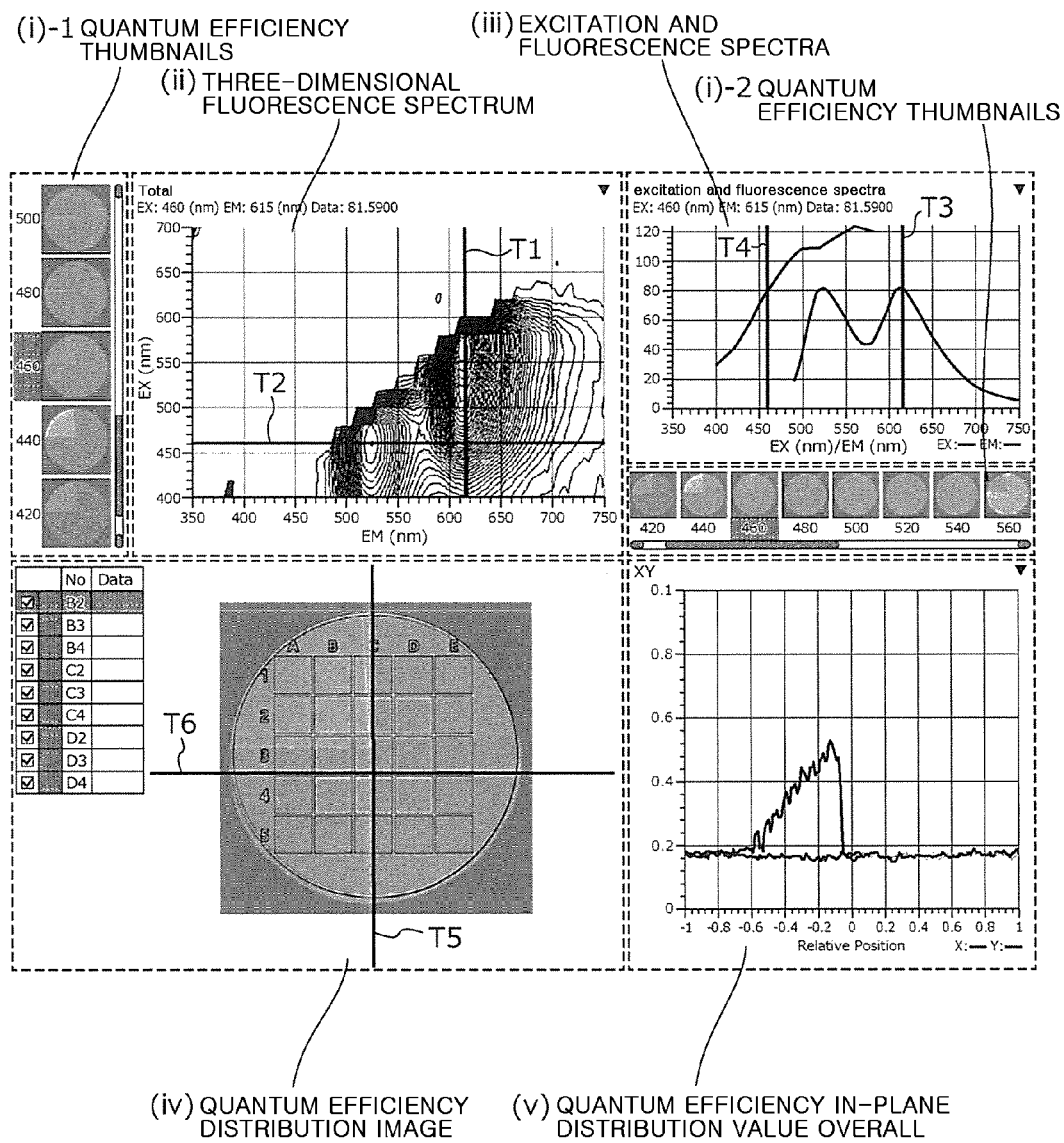
FIG. 18 is a diagram of a measurement result image to be displayed on the display device.

FIG. 16 to FIG. 18 show images displayed on the display device 42 as images of measurement results that are obtained in the embodiments described above. That is, the display device 42 executes a method of displaying a quantum efficiency distribution with which a quantum efficiency distribution obtained by one of the methods of obtaining a quantum efficiency distribution described above is displayed.

In those embodiments, images and fluorescence spectra obtained in a suitable wavelength range at suitable wavelength intervals are used to calculate an image of a quantum efficiency distribution at each excitation wavelength. "Area (i)-1: quantum efficiency thumbnails" is an area in which a plurality of images of the quantum efficiency distribution at each excitation wavelength are aligned and displayed in a thumbnail format. "Area (ii): three-dimensional fluorescence spectrum" is an area in which a fluorescence spectrum that is three-dimensional data with the fluorescence wavelength plotted on an X-axis, the excitation wavelength plotted on a Y-axis, and the fluorescence intensity plotted on a Z-axis is displayed in the form of a contour map and a heat map using gradations or the like. Trace bars T1 and T2 related to the excitation wavelength and the fluorescence wavelength are displayed in Area (ii), and it is preferred to set those Areas so that, when one of the thumbnail images displayed in Area (i)-1 is selected and highlighted, the trace bar T2 of the three-dimensional fluorescence spectrum in Area (ii) moves in conjunction. It is also preferred to set those Areas so that, conversely, when the trace bar T2 of the three-dimensional fluorescence spectrum in Area (ii) is moved, one of the thumbnail images displayed in Area (i)-1 is selected and highlighted.

From the three-dimensional fluorescence spectrum displayed in Area (ii), an excitation light spectrum is obtained by cutting out data in which the fluorescence wavelength on the X-axis is fixed and the excitation wavelength on the Y-axis is a variable. Data in which the excitation wavelength on the Y-axis is fixed and the fluorescence wavelength on the X-axis is a variable is cut out of the three-dimensional fluorescence spectrum to obtain a fluorescence spectrum. The pieces of cut-out data are cut out at wavelength positions on the trace bars T1 and T2 displayed on the three-dimensional fluorescence spectrum of Area (ii), and it is preferred to set those Areas so that the cut-out data is displayed in "Area (iii): excitation and fluorescence spectra" as an excitation light spectrum or a fluorescence spectrum. It is preferred to set those Areas so that the excitation light spectrum and the fluorescence spectrum in Area (iii) are displayed in conjunction with the moving of the trace bars T1 and T2 of the three-dimensional fluorescence spectrum. It is also preferred to set those Areas so that trace bars T3 and T4 corresponding to the trace bars T1 and T2 of the three-dimensional fluorescence spectrum are displayed in Area (iii) as well.

An image of a quantum efficiency distribution is calculated for each excitation wavelength, and aligned images of a quantum efficiency distribution may accordingly be displayed along the excitation wavelength axis of Area (iii) as "Area (i)-2: quantum efficiency thumbnails". In this case, the corresponding trace bars T3 and T4 are displayed at wavelength positions on the X-axis in an area for displaying the excitation light spectrum and the fluorescence spectrum in Area (iii), and it is recommended to set those Areas so that, when the trace bar corresponding to a target excitation wavelength is selected, an image of a quantum efficiency distribution at the target excitation wavelength is selected and highlighted in Area (i)-2. It is also recommended to set those Areas so that, conversely, when one of the thumbnail images displayed in Area (i)-2 is selected and highlighted, one of the trace bars indicating the excitation wavelength of the three-dimensional fluorescence spectrum moves in conjunction with a relevant excitation wavelength in Area (iii).

In FIG. 16, an image of a quantum efficiency distribution at an excitation light wavelength of 460 nm is selected in Area (i)-1, the trace bar T2 is set to 460 nm on the Y-axis, and the trace bar T4 is set to 460 nm as well on the X-axis. The image of the quantum efficiency distribution at an excitation light wavelength of 460 nm is selected also in Area (i)-2.

On a screen of FIG. 16 in this state, the operator uses the operation panel 41, a mouse, or the like to first select an image of a quantum efficiency distribution at an excitation light wavelength of 500 nm in Area (i)-1. Then, the trace bars T2 and T4 move to positions of 500 nm to select the image of the quantum efficiency distribution at an excitation light wavelength of 500 nm in Area (i)-2 as well, and the screen transitions to a screen of FIG. 17. The transition to the screen of FIG. 17 occurs also when the operator's initial operation on the screen of FIG. 16 is to move the trace bar T2 or T4 to 500 nm, or to select the image of the quantum efficiency distribution at an excitation light wavelength of 500 nm in Area (i)-2.

In "Area (iv): quantum efficiency distribution image", the image of the quantum efficiency distribution selected and highlighted in Area (i)-1 and Area (i)-2 is displayed enlarged. A quantum efficiency distribution in a surface of an observed sample is displayed in Area (iv) in XY coordinates. The display device 42 further displays at least two trace bars T5 and T6, which specify the positions of the XY coordinates on the X-axis and the Y axis. Changes in the value of quantum efficiency along the trace bars T5 and T6 are displayed in Area (v) in a graph format. It is recommended to set those Areas so that the cutting out of an X coordinate and the cutting out of a Y coordinate are displayed, on top of one another or individually, in conjunction with the trace bars T5 and T6. In conjunction with the moving of the trace bars T5 and T6, a quantum efficiency distribution at a corresponding coordinate position is displayed in Area (v). Sections may be displayed in Area (iv) so that averaged quantum efficiencies of selected sections are displayed as a list. In this example, 5×5 sections are displayed in Column A to Column E and Row 1 to Row 5, and twenty-five sections, specifically, A1 to E5, are selected and displayed in a list format.

When the operator uses the operation panel 41, a mouse, or the like on the screen of FIG. 16 to move the trace bar T5 or T6 in Area (iv), the screen transitions to a screen of FIG. 18. What is displayed in Area (v) changes with the moving of the trace bar T5 or T6 as well.

As illustrated in FIG. 16 to FIG. 18, the display device 42 can display, on the screen, in a consolidated manner, images of quantum efficiency distributions at respective excitation wavelengths and a three dimensional fluorescence spectrum, which are calculated with the use of images and fluorescence spectra obtained in a suitable wavelength range at suitable wavelength intervals. This enables the operator to easily grasp fluorescence characteristics of a sample in a comprehensive manner from the viewpoints of excitation wavelength, fluorescence wavelength, and quantum efficiency in-plane distribution.

Figure 19:
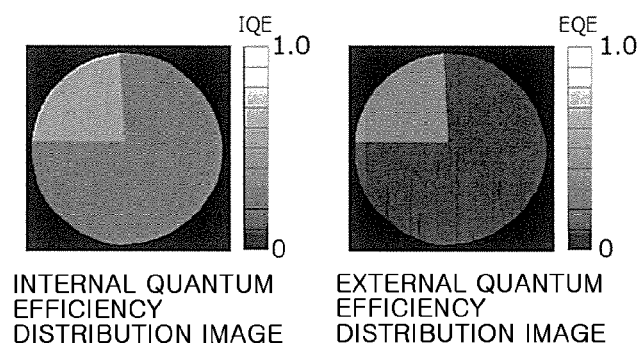
FIG. 19 is a diagram for illustrating an internal quantum efficiency distribution image and an external quantum efficiency distribution image.

FIG. 19 is an illustration of an example of images of an internal quantum efficiency distribution and an external quantum efficiency distribution. The internal quantum efficiency and the external quantum efficiency basically take a value between 0 and 1, and distributions thereof are accordingly recommended to be shown in gray scales or as a heat map. In the case of a gray scale, for example, a gray scale in which white is assigned 1, black is assigned 0, and a value indicating brightness is changed in stages between 1 and 0 is used to display the quantum efficiency distributions. A scale bar indicating a brightness of from 0 to 1 may be displayed in the vicinity of the distribution images. Expression (1) and Expression (2) reveal that the irradiation photon count is higher than the absorption photon count of the denominator, and the external quantum efficiency therefore has a value smaller than that of the internal quantum efficiency. The color tone of the external quantum efficiency distribution image is accordingly darker than the color tone of the internal quantum efficiency distribution image. The internal quantum efficiency distribution image and the external quantum efficiency distribution image are calculable from the same measurement result, and are accordingly calculated simultaneously to be displayed in, for example, Area (iv) and Area (v) of FIG. 16 to FIG. 18 in turns.

The methods of obtaining and displaying a quantum efficiency distribution described above are executable with a predetermined program. Such a program is read out of a storage device installed inside or outside the computer 31. The program causes the computer to execute the steps described above, which enables the fluorescence spectrophotometer 1 to activate, obtain a quantum efficiency distribution, and display the quantum efficiency distribution with the progress of the steps.

According to the present invention, the quantum efficiency distribution in the predetermined surface of the sample to be measured can be grasped, and the more detailed properties of the sample can therefore be found out.

The present invention is not limited to the embodiments described above, and encompasses modifications, alterations, and other changes as appropriate. The materials, shapes, dimensions, numerical values, modes, numbers, placement, and the like of the components in the embodiments described above are also not to limit the present invention, and any materials, shapes, dimensions, numerical values, modes, numbers, placement, and the like are employable as long as the present invention can be carried out.

The present invention is useful for fields that require a grasp of detailed characteristics of a sample, in particular, a quantum efficiency distribution in a surface of a sample and other such detailed fluorescence characteristics.

What is claimed is:

1. A method of obtaining a quantum efficiency distribution in a predetermined surface of a sample, comprising:
   irradiating a reference material with excitation light that belongs to a first wavelength range;
   obtaining, by taking an image of the reference material with a photographing device, which includes, at least, a first channel corresponding to the first wavelength range and a second channel corresponding to a second wavelength range, an irradiation luminance value of the first channel and an irradiation luminance value of the second channel in each pixel of the image of the reference material;
   irradiating the predetermined surface of the sample with the excitation light;
   obtaining, by taking an image of the predetermined surface with the photographing device, a measurement luminance value of the first channel and a measurement luminance value of the second channel in each pixel of the image of the predetermined surface;
   calculating an absorption luminance value from a difference between the irradiation luminance value of the first channel and the measurement luminance value of the first channel;
   calculating a fluorescence luminance value from a difference between the irradiation luminance value of the second channel and the measurement luminance value of the second channel;
   calculating a quantum efficiency of each pixel based on the irradiation luminance values, the absorption luminance value, and the fluorescence luminance value; and
   obtaining, from the quantum efficiency of each pixel, the quantum efficiency distribution in the predetermined surface of the sample.

2. The method of obtaining a quantum efficiency distribution according to claim 1,
wherein the photographing device further includes a third channel corresponding to a third wavelength range, and
wherein the fluorescence luminance value is calculated from a sum of a difference between the irradiation luminance value of the second channel and the measurement luminance value of the second channel, and a difference between an irradiation luminance value of the third channel and a measurement luminance value of the third channel.

3. The method of obtaining a quantum efficiency distribution according to claim 2, wherein the first channel is a B channel, the second channel is a G channel, and the third channel is an R channel.

4. The method of obtaining a quantum efficiency distribution according to claim 1, further comprising:
calculating an internal quantum efficiency of each pixel from a ratio of the fluorescence luminance value and the absorption luminance value; and
calculating an external quantum efficiency of each pixel from a ratio of the fluorescence luminance value and the irradiation luminance value.

5. The method of obtaining a quantum efficiency distribution according to claim 1, wherein the reference material is a reference white plate.

6. The method of obtaining a quantum efficiency distribution according to claim 1, wherein the reference material and the sample are placed in an integrating sphere of a fluorescence spectrophotometer to be irradiated with the excitation light.

7. A method of displaying a quantum efficiency distribution, comprising displaying, on a display device, a quantum efficiency distribution that is obtained by the method of obtaining a quantum efficiency distribution of claim 1, on a coordinate system corresponding to the predetermined surface.

8. The method of displaying a quantum efficiency distribution according to claim 7, wherein the display device is configured to display, in a thumbnail format, quantum efficiency distributions which are obtained on a fluorescence wavelength basis and aligned.

9. The method of displaying a quantum efficiency distribution according to claim 7,
wherein the display device is configured to display at least two trace bars used to specify a position on an X-axis of the coordinate system and a position on a Y-axis of the coordinate system, and
wherein the display device is configured to further display, in a graph format, changes in quantum efficiency value along the at least two trace bars.

10. A method of obtaining a quantum efficiency distribution in a predetermined surface of a sample, comprising:
irradiating a reference material with excitation light;
obtaining, by taking an image of the reference material with a photographing device, for each wavelength, an irradiation luminance value in each pixel of the image of the reference material;
irradiating the predetermined surface of the sample with the excitation light;
obtaining, by taking an image of the predetermined surface with the photographing device, for each wavelength, a measurement luminance value in each pixel of the image of the predetermined surface;
obtaining a fluorescence spectrum that is obtained from irradiation with the excitation light;
calculating, based on the fluorescence spectrum, fluorescence intensity distribution data about a fluorescence intensity distribution to be assigned to each fluorescence wavelength;
calculating, based on the irradiation luminance value and the measurement luminance value, which are obtained for each wavelength in each pixel, and on the fluorescence intensity distribution data, a reflection component coefficient and a fluorescence component coefficient in the pixel;
calculating, based on the reflection component coefficient and the fluorescence component coefficient, a quantum efficiency of each pixel; and
obtaining, from the quantum efficiency of each pixel, the quantum efficiency distribution in the predetermined surface of the sample.

11. The method of obtaining a quantum efficiency distribution according to claim 10,
wherein the photographing device includes a B channel corresponding to a first wavelength range, a G channel corresponding to a second wavelength range, and an R channel corresponding to a third wavelength range,
wherein the first wavelength range, the second wavelength range, and the third wavelength range are each assigned a fluorescence intensity distribution indicated by fluorescence intensity distribution data, and
wherein the reflection component coefficient and the fluorescence component coefficient are calculated for each of the B channel, the G channel, and the R channel, and then the reflection component coefficient and the fluorescence component coefficient in each pixel are calculated.

12. The method of obtaining a quantum efficiency distribution according to claim 10, further comprising:
calculating an amount of reflected light of each pixel based on the reflection component coefficient and the irradiation luminance value;
calculating a fluorescence amount of each pixel based on the fluorescence component coefficient and the fluorescence intensity distribution data; and
calculating an absorption amount of each pixel from a difference between an irradiation amount corresponding to the irradiation luminance value and the amount of reflected light.

13. The method of obtaining a quantum efficiency distribution according to claim 12, further comprising:
calculating an internal quantum efficiency of each pixel from a ratio of the fluorescence amount and the absorption amount; and
calculating an external quantum efficiency of each pixel from a ratio of the fluorescence amount and the irradiation amount.

14. The method of obtaining a quantum efficiency distribution according to claim 10, wherein the reference material is a reference white plate.

15. The method of obtaining a quantum efficiency distribution according to claim 10, wherein the reference material and the sample are placed in an integrating sphere of a fluorescence spectrophotometer to be irradiated with the excitation light.

16. A method of displaying a quantum efficiency distribution, comprising displaying, on a display device, a quantum efficiency distribution that is obtained by the method of obtaining a quantum efficiency distribution of claim 10, on a coordinate system corresponding to the predetermined surface.

17. The method of displaying a quantum efficiency distribution according to claim 16, wherein the display device is configured to display, in a thumbnail format, quantum efficiency distributions which are obtained on a fluorescence wavelength basis and aligned.

18. The method of displaying a quantum efficiency distribution according to claim 16,
wherein the display device is configured to display at least two trace bars used to specify a position on an X-axis of the coordinate system and a position on a Y-axis of the coordinate system, and
wherein the display device is configured to further display, in a graph format, changes in quantum efficiency value along the at least two trace bars.

19. A computer-readable and non-transitory medium storing a program for obtaining a quantum efficiency distribution in a predetermined surface of a sample, the predetermined surface of the sample being irradiated with excitation light that belongs to a first wavelength range by a fluorescence spectrophotometer, the fluorescence spectrophotometer being configured to irradiate a reference material with the excitation light as well as the predetermined surface of the sample,
the program controlling a computer so that the computer executes the steps of:
obtaining, by taking an image of the reference material with a photographing device, which includes, at least, a first channel corresponding to the first wavelength range and a second channel corresponding to a second wavelength range, an irradiation luminance value of the first channel and an irradiation luminance value of the second channel in each pixel of the image of the reference material;
obtaining, by taking an image of the predetermined surface with the photographing device, a measurement luminance value of the first channel and a measurement luminance value of the second channel in each pixel of the image of the predetermined surface;
calculating an absorption luminance value from a difference between the irradiation luminance value of the first channel and the measurement luminance value of the first channel;
calculating a fluorescence luminance value from a difference between the irradiation luminance value of the second channel and the measurement luminance value of the second channel;
calculating a quantum efficiency of each pixel based on the irradiation luminance values, the absorption luminance value, and the fluorescence luminance value; and
obtaining, from the quantum efficiency of each pixel, the quantum efficiency distribution in the predetermined surface of the sample.

20. A computer-readable and non-transitory medium storing a program for displaying a quantum efficiency distribution, the program controlling a display device so that the display device displays a quantum efficiency distribution obtained by the program for obtaining a quantum efficiency distribution of claim 19, on a coordinate system corresponding to the predetermined surface.

21. A computer-readable and non-transitory medium storing a program for obtaining a quantum efficiency distribution in a predetermined surface of a sample, the predetermined surface of the sample being irradiated with excitation light by a fluorescence spectrophotometer, the fluorescence spectrophotometer being configured to irradiate a reference material with the excitation light as well as the predetermined surface of the sample,
the program controlling a computer so that the computer executes the steps of:
obtaining, by taking an image of the reference material with a photographing device, for each wavelength, an irradiation luminance value in each pixel of the image of the reference material;
obtaining, by taking an image of the predetermined surface with the photographing device, for each wavelength, a measurement luminance value in each pixel of the image of the predetermined surface;
obtaining a fluorescence spectrum that is obtained from irradiation with the excitation light;
calculating, in the fluorescence spectrum, fluorescence intensity distribution data about a fluorescence intensity distribution to be assigned to each excitation wavelength;
calculating, based on the irradiation luminance value and the measurement luminance value, which are obtained for each wavelength in each pixel, and on the fluorescence intensity distribution data, a reflection component coefficient and a fluorescence component coefficient in the pixel;
calculating, based on the reflection component coefficient and the fluorescence component coefficient, a quantum efficiency of each pixel; and
obtaining, from the quantum efficiency of each pixel, the quantum efficiency distribution in the predetermined surface of the sample.

22. A computer-readable and non-transitory medium storing a program for displaying a quantum efficiency distribution, the program controlling a display device so that the display device displays a quantum efficiency distribution obtained by the program for obtaining a quantum efficiency distribution of claim 21, on a coordinate system corresponding to the predetermined surface.

23. A fluorescence spectrophotometer, which is configured to obtain a quantum efficiency distribution in a predetermined surface of a sample, comprising:
a light source configured to irradiate a reference material and the predetermined surface of the sample with excitation light that belongs to a first wavelength range;
a photographing device including, at least, a first channel, which corresponds to the first wavelength range, and a second channel, which corresponds to a second wavelength range; and
a computer,
wherein the photographing device is configured to obtain, by taking an image of the reference material, an irradiation luminance value of the first channel and an irradiation luminance value of the second channel in each pixel of the image of the reference material, and is configured to obtain, by taking an image of the predetermined surface, a measurement luminance value of the first channel and a measurement luminance value of the second channel in each pixel of the image of the predetermined surface, and
wherein the computer is configured to:
calculate an absorption luminance value from a difference between the irradiation luminance value of the first channel and the measurement luminance value of the first channel;
calculate a fluorescence luminance value from a difference between the irradiation luminance value of the second channel and the measurement luminance value of the second channel;

calculate a quantum efficiency of each pixel based on the irradiation luminance values, the absorption luminance value, and the fluorescence luminance value; and obtain, from the quantum efficiency of each pixel, the quantum efficiency distribution in the predetermined surface of the sample.

24. A display device, which is configured to display a quantum efficiency distribution that is obtained by the fluorescence spectrophotometer of claim 23, on a coordinate system corresponding to the predetermined surface.

25. A fluorescence spectrophotometer, which is configured to obtain a quantum efficiency distribution in a predetermined surface of a sample, comprising:

a light source configured to irradiate a reference material and the predetermined surface of the sample with excitation light;

a photographing device;

a detector configured to obtain a fluorescence spectrum that is obtained from irradiation with the excitation light; and a computer, wherein the photographing device is configured to obtain, by taking an image of the reference material, for each wavelength, an irradiation luminance value in each pixel of the image of the reference material, and is configured to obtain, by taking an image of the predetermined surface, for each wavelength, a measurement luminance value in each pixel of the image of the predetermined surface, and wherein the computer is configured to:

calculate, in the fluorescence spectrum, fluorescence intensity distribution data about a fluorescence intensity distribution to be assigned to each excitation wavelength;

calculate, based on the irradiation luminance value and the measurement luminance value, which are obtained for each wavelength in each pixel, and on the fluorescence intensity distribution data, a reflection component coefficient and a fluorescence component coefficient in the pixel;

calculate, based on the reflection component coefficient and the fluorescence component coefficient, a quantum efficiency of each pixel; and obtain, from the quantum efficiency of each pixel, the quantum efficiency distribution in the predetermined surface of the sample.

26. A display device, which is configured to display a quantum efficiency distribution that is obtained by the fluorescence spectrophotometer of claim 25, on a coordinate system corresponding to the predetermined surface.

* * * * *